(12) United States Patent
Hultine et al.

(10) Patent No.: US 12,278,756 B2
(45) Date of Patent: Apr. 15, 2025

(54) DYNAMIC ANYCAST CLIENT ROUTING AND HEALTH MANAGEMENT

(71) Applicant: Charter Communications Operating, LLC, St. Louis, MO (US)

(72) Inventors: Bradley D. Hultine, Centennial, CO (US); Jason M. Donovan, Denver, CO (US); Nikhil H. Parikh, Arvada, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/235,083

(22) Filed: Aug. 17, 2023

(65) Prior Publication Data

US 2024/0297911 A1   Sep. 5, 2024

Related U.S. Application Data

(60) Provisional application No. 63/449,980, filed on Mar. 4, 2023.

(51) Int. Cl.
| | |
|---|---|
| *G06F 13/00* | (2006.01) |
| *H04L 45/00* | (2022.01) |
| *H04L 45/02* | (2022.01) |
| *H04L 45/74* | (2022.01) |
| *H04L 65/61* | (2022.01) |
| *H04L 65/80* | (2022.01) |

(52) U.S. Cl.
CPC .............. *H04L 45/22* (2013.01); *H04L 45/04* (2013.01); *H04L 45/74* (2013.01); *H04L 65/61* (2022.05); *H04L 65/80* (2013.01)

(58) Field of Classification Search
CPC ......... H04L 45/22; H04L 45/04; H04L 45/74; H04L 65/61; H04L 65/80
USPC ................. 709/238, 239, 249, 250, 217–219
See application file for complete search history.

(56) References Cited

U.S. PATENT DOCUMENTS

| | | | |
|---|---|---|---|
| 7,818,402 B1 | 10/2010 | Zhang | |
| 10,455,030 B2 * | 10/2019 | Maslak | ............... H04L 61/4511 |
| 11,601,513 B2 * | 3/2023 | Maslak | .................. H04L 67/52 |
| 11,706,292 B1 | 7/2023 | Friedrich et al. | |
| 11,805,184 B2 * | 10/2023 | Maslak | ............... H04L 67/1004 |
| 12,028,427 B2 * | 7/2024 | Maslak | .................. H04L 67/52 |
| 2007/0050491 A1 | 3/2007 | Kataoka et al. | |

(Continued)

*Primary Examiner* — Kenneth R Coulter
(74) *Attorney, Agent, or Firm* — Armis IP Law, LLC

(57) ABSTRACT

A content distribution system as discussed herein includes one or more instances of communication management hardware. The communication management hardware tracks a status of multiple different groupings of edge nodes in a content delivery network. Each of the edge nodes is operative to distribute content (such as video content, video segments, digital assets, etc.) in a network environment. The communication device is redirected to the communication management hardware for selection of an appropriate edge node to deliver content to the communication device. To provide load balancing, the communication management hardware selects an appropriate edge node from the different available edge nodes in different edge node clusters. The communication management hardware then communicates an identity of the selected edge node to the communication device. The communication device then communicates with the selected edge node to retrieve the content.

43 Claims, 20 Drawing Sheets

1900

TRACK A FIRST CONTENT DISTRIBUTION STATUS OF A FIRST GROUP OF NETWORK NODES, A FIRST ANYCAST NODE ASSIGNED TO THE FIRST GROUP — 1910

TRACK A SECOND CONTENT DISTRIBUTION STATUS OF A SECOND GROUP OF NETWORK NODES, A SECOND ANYCAST NODE ASSIGNED TO THE SECOND GROUP — 1920

IN RESPONSE TO RECEIVING A REQUEST ORIGINATING FROM A COMMUNICATION DEVICE FOR ASSIGNMENT OF A RESOURCE FROM WHICH TO RETRIEVE CONTENT, SELECT A NETWORK NODE FROM AMONGST A COMBINATION OF THE FIRST GROUP AND THE SECOND GROUP — 1930

COMMUNICATE AN IDENTITY OF THE SELECTED NETWORK NODE TO THE COMMUNICATION DEVICE — 1940

(56) References Cited

U.S. PATENT DOCUMENTS

| | | |
|---|---|---|
| 2015/0026251 A1 | 1/2015 | Van Der Merwe et al. |
| 2016/0119279 A1* | 4/2016 | Maslak .............. H04L 61/4511 |
| 2016/0248884 A1 | 8/2016 | Larabi et al. |
| 2017/0195447 A1 | 7/2017 | Panagos et al. |
| 2024/0297842 A1* | 9/2024 | Donovan ................ H04L 45/04 |

* cited by examiner

DYNAMIC ANYCAST CLIENT ROUTING AND HEALTH MANAGEMENT

RELATED APPLICATION

This application claims the benefit of earlier filed U.S. Provisional Patent Application Ser. No. 63/449,980 entitled "DYNAMIC ANYCAST CLIENT ROUTING AND HEALTH MANAGEMENT,", filed on Mar. 4, 2023, the entire teachings of which are incorporated herein by this reference.

BACKGROUND

A conventional content delivery network, or content delivery network (CDN), is a geographically distributed network of proxy servers and their data centers. Such networks typically provide high availability and performance by distributing the service spatially relative to end users. CDNs came into existence in the late 1990s as a means for alleviating the performance bottlenecks of the Internet. Since then, CDNs have grown to serve a large portion of the Internet content today, including web objects (text, graphics and scripts), downloadable objects (media files, software, documents), applications (e-commerce, portals), live streaming media, on-demand streaming media, and social media sites.

BRIEF DESCRIPTION OF EMBODIMENTS

There are deficiencies associated with conventional techniques of distributing data (a.k.a., content) in a network environment. For example, conventional techniques require a substantial amount of resources and energy at the local level to manage and distribute requested content to multiple communication devices.

Embodiment #1

Embodiments herein provide improved use of distributing content in a network environment. For example, a network environment includes a communication device and multiple resources from which to retrieve content. The communication device transmits a request for content (such as in accordance with an anycast protocol) in a network environment. Assume that the request for content is received by a first anycast node of multiple anycast nodes in the network environment. In response to transmitting the request for retrieval of content in the network environment, the communication device receives a redirect response from a first anycast node in the network. In accordance with the redirect response from the first anycast node, the communication device communicates a redirect message to management hardware in the network environment. The management hardware facilitates or manages distribution of content in the network environment from multiple resources associated with the multiple anycast nodes. In response to communicating the redirect message to the management hardware, the communication device receives an identity of a first network node (such as a particular edge node managed by the first anycast node or a second anycast node) from which to retrieve the content.

As discussed herein, the communication device may receive a segment of the content from the first network node in response to communicating the request for retrieval of content to the first network node.

As previously discussed, the first network node may be an edge node of a first group of edge nodes associated with the first anycast node (e.g., anycast proxy or management node that manages the first group of edge nodes). Alternatively, the first network node may be an edge node of a second group of edge nodes associated with a second anycast node (e.g., anycast proxy or management node that manages the second group of edge nodes). Each of the edge nodes can be configured to support distribution of content requested by the communication device.

In accordance with further examples, the redirect response received from the first anycast node can be configured to redirect the communication device to the management hardware for assignment of a respective content distribution node from which to retrieve the content.

In accordance with still further examples, the first anycast node is one of multiple anycast nodes in the network. The network environment can be configured to route the request for retrieval of content generated by the communication device to the first anycast node in the network based on a network address specifying a destination of delivering the request. The network address used by the communication device as a destination address may be assigned to each of the multiple anycast nodes in the network. The network can be configured to forward the anycast request from the communication device to the nearest anycast content distribution node.

Note that the communication device can be configured to receive the network address of the content distribution node from which to retrieve content in any suitable manner. For example, the communication device can be configured to receive the network address (such as identity of the first network node selected by the communication management hardware) from a Domain Name Server (DNS) in communication with the management hardware.

Still further, the communication device can be configured to communicate the redirect message to a translator entity (such as DNS resource or the like). The translator entity forwards the redirect message to the management entity for assignment of a resource from which the communication device is to retrieve the content.

Yet further, the communication device can be configured to receive an anycast network address from a network address translator entity. The first anycast node is assigned the anycast network address. The communication device can be configured to receive the anycast network address assigned to the first anycast node in response to the communication device communicating web address information to the network address translator entity.

Embodiment #2

In accordance with another example, a communication management resource receives a request from a communication device for retrieval of content from a content delivery network supporting anycast communications. The communication management resource determines a location associated with the communication device. In response to receiving the request, the communication management resource provides the communication device with unicast information assigned to or associated with a network node in the content delivery network based on the determined location associated with the communication device. The communication device then uses the unicast information to retrieve the requested content from the network node.

In one example, the unicast information is unicast web information indicating a destination in the content delivery network from which to retrieve the requested content. The location indicates any suitable information such as a geographical region in which the communication device resides, actual location of the communication device, location of one or more resources nearest the communication device for distributing content, and so on.

The unicast information can be or include any suitable information such as a location specific URL (Uniform Resource Locator) associated with the content delivery network. The URL may indicate a particular network node of multiple possible network nodes in the content delivery network.

In accordance with further examples, the communication management resource as discussed herein receives feedback prior to receiving the request for retrieval of content from the communication device. The communication management resource can be configured to receive the feedback from an anycast node in the content delivery network. The feedback indicates the location associated with the communication device such as a location of a cluster of resources nearest the communication device in the network environment.

The location associated with the communication device can be determined in any suitable manner. For example, in one example, the communication management resource determines the location associated with the communication device via retrieving a first network address from the request, the first network address is a unique identifier (identity) value assigned to the communication device. The communication management resource received notification of the location associated with the communication device based on the feedback as previously discussed. The communication management resource maps the first network address to the location associated with the communication device.

In accordance with still further examples, the communication management resource or other suitable entity tracks ng a duration of time in which the location associated with the communication device is valid. For example, the communication device may move over time, so the location associated with the communication device may be valid only for a limited time.

The communication management resource as further discussed herein can be configured to: i) track a first content distribution (delivery) status of a first group of network nodes in a content delivery network, a first anycast management node is assigned to manage the first group; ii) track a second content distribution (delivery) status of a second group of network nodes in the content delivery network, a second anycast management node assigned to manage the second group; and so on. The communication management resource produce the unicast information associated with the request to specify a first network address assigned to a first network node in the content delivery network. The first network node is selected from a combination of the network nodes in the first group and the network nodes in the second group. The communication management resource provides the communication device with the unicast information, which includes communicating the first network address to the communication device for use by the communication device to retrieve the requested content from the first network node in the content delivery network.

Still further, the first network node may reside in the second group of network nodes; wherein the network nodes in the first group reside at the location associated with the communication device; and the network nodes in the second group reside at a disparate location with respect to the network nodes in the first group.

In still further examples, the content distribution system as discussed herein includes one or more instances of communication management hardware. The communication management hardware tracks a status of multiple different groupings of edge nodes operative to distribute content (such as video content, video segments, digital assets, etc.) in a network environment. For example, the communication management hardware tracks a first content distribution (delivery) status of a first group of network nodes (such as first content distribution edge nodes) assigned and thus managed by a first anycast management node; the communication management hardware tracks a second content distribution (delivery) status of a second group of network nodes (such as second content distribution edge nodes) assigned and thus managed by a second anycast management node; and so on. In response to receiving a request originating from a communication device for assignment of a resource (such as an edge node in any of the groups) from which to retrieve content, the communication management hardware selects an appropriate network node from amongst a combination of all of the groups such as from the first group and the second group. The communication management hardware then communicates an identity of the selected content distribution network node (a.k.a., edge node) to the communication device. In a manner as previously discussed, the communication device then communicates with the selected network node to retrieve the content.

Note that the communication device can be configured to include an identity of the first anycast node to the communication management hardware. Forwarding of the identity of the first any cast node to the communication management hardware notifies the communication management hardware of the any cast node and corresponding edge content distribution nodes nearest the communication device. In other words, the communication management hardware knows the location of the first any cast node identified by the requests.

As further discussed herein, the selected network node may reside in any of the groups of network nodes monitored by the communication management hardware such as the first group or the second group.

In accordance with further examples, the communication management heart can be configured to map an identity of the first anycast node to a first location in the network. In response to detecting that the second anycast node resides in a vicinity of the first anycast node and that the network nodes in the first group of content distribution network nodes are unavailable or are not good candidates to distribute the content to the communication device, the communication management hardware selects the network node from the second group of network nodes instead of the first group of network nodes.

As previously discussed, the communication management hardware tracks the content distribution (delivery) status (such as ability for each of the content distribution network nodes to distribute content) in the network environment. To this end, the communication management hardware can be configured to rank the network nodes in each of the groups based on their ability to distribute the content to the communication device. For example, the communication management hardware can be configured to rank the network nodes in the first group based on their ability to distribute content to the communication device; the communication management can be configured to rank the network nodes in the second group based on their ability to distribute content to the communication device; and so on. The communication management hardware uses the ranking as a basis to select the identity of the network node from the first group.

More specifically, assume that the communication management hardware determines that the communication devices nearest the first group of network nodes. In such an instance, the communication management hardware can be configured to consider which of content distribution network node in the first group is best suited to deliver the requested content to the communication device. If none of the content distribution network nodes in the first group are good candidates in which to distribute requested content, the communication management hardware can be configured to consider another group of content distribution network nodes in a vicinity of the communication device. Assume that the second group of content distribution network nodes are also close to the communication device. In the instance in which none of the content distribution network nodes in the first group are good candidates to distribute requested content to the communication device, the communication management hardware considers which of the content distribution network nodes in the second group is best suited to deliver the request content to the communication device. In this latter instance, assuming that the second group includes a good candidate to distribute the requested content to the communication device, the communication management hardware selects that the candidate and provides notification of the identity of that selected network node to the communication device. In a manner as previously discussed, the communication device then uses that identity as a basis in which to communicate with that selected network node and retrieve the desired content.

Thus, embodiments herein provide novel ways of providing improved use of resources and load balancing in a network environment to handle new content delivery tasks.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, executable instructions, etc., that supports operations as discussed herein.

One embodiment includes a computer readable storage medium and/or system having instructions stored thereon to facilitate distribution of content in a network environment. The instructions, when executed by computer processor hardware, cause the computer processor hardware (such as one or more co-located or disparately processor devices) to: in response to transmitting a request for retrieval of content in a network, receive a redirect response from a first anycast node in the network; in accordance with the redirect response from the first anycast node, communicate a redirect message to the management entity; and in response to communicating the redirect message to the management entity, receive an identity of a first network node from which to retrieve the content.

Another embodiment as discussed herein includes a computer readable storage medium and/or system having instructions stored thereon to facilitate distribution of content in a network environment. The instructions, when executed by computer processor hardware, cause the computer processor hardware (such as one or more co-located or disparately processor devices) to: track a first content delivery status of a first group of network nodes, a first anycast node assigned to the first group; track a second content delivery status of a second group of network nodes, a second anycast node assigned to the second group; in response to receiving a request originating from a communication device for assignment of a resource from which to retrieve content, select a network node from amongst a combination of the first group and the second group; and communicate an identity of the selected network node to the communication device.

Another embodiment as discussed herein includes a computer readable storage medium and/or system having instructions stored thereon to facilitate distribution of content in a network environment. The instructions, when executed by computer processor hardware, cause the computer processor hardware (such as one or more co-located or disparately processor devices) to: receive a request from a communication device for retrieval of content from a content delivery network supporting anycast communications; determine a location associated with the communication device; based on the location, select unicast information; and in response to receiving the request, provide the communication device with unicast information associated with a network node in the content delivery network based on the determined location associated with the communication device.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved distribution of content to multiple communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
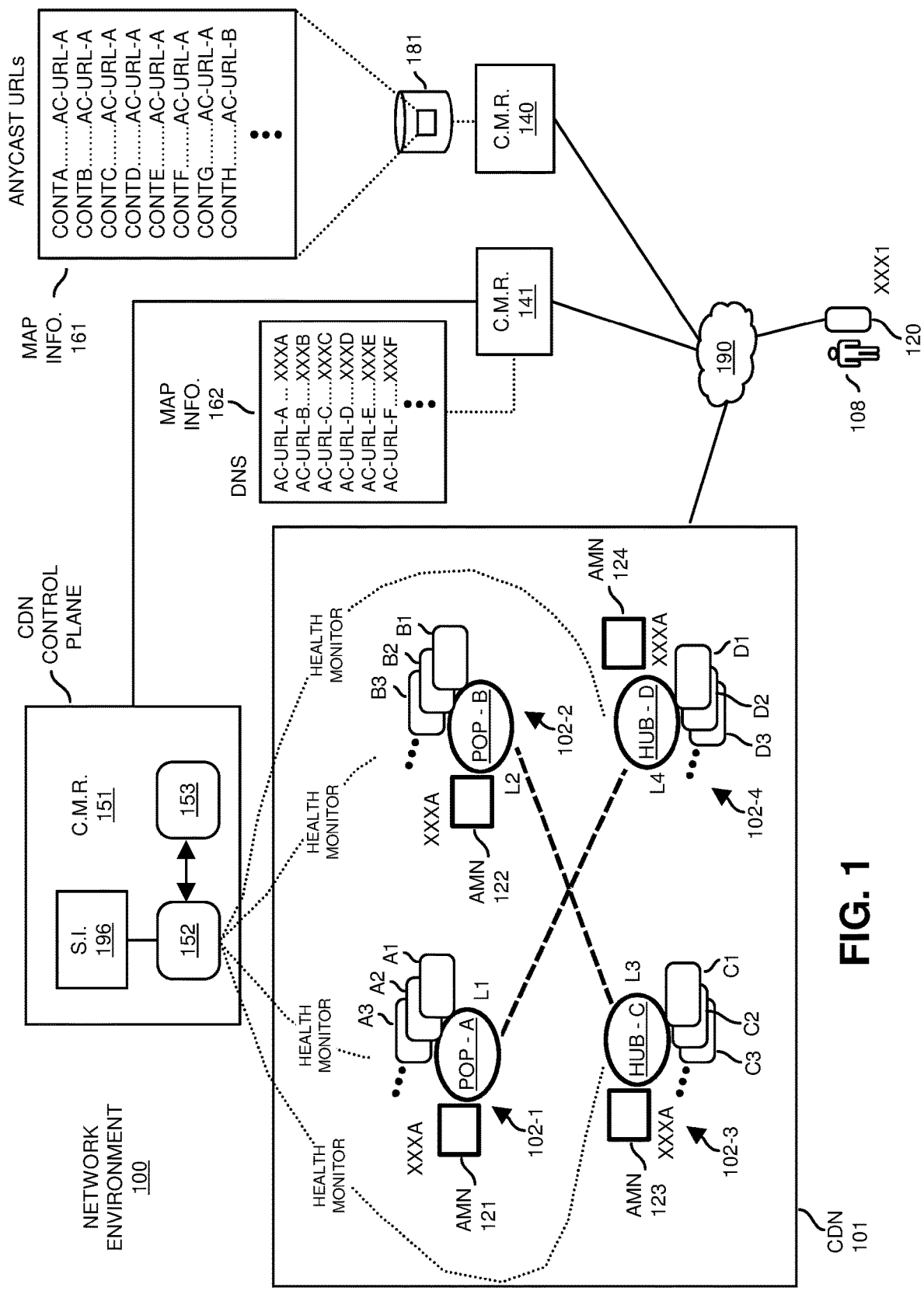
FIG. 1 is an example diagram illustrating a network environment supporting monitoring of network nodes and content distribution as discussed herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Anycast addressing for CDN edge nodes can make it easy for routing client requests to the closest edge node to serve them. Implementation of anycast techniques typically means you cede control of where client requests are handled to the network (management resource) instead of the CDN control plane (global). Many CDNs use DNS based client routing, which means the client resolves the DNS domain and the anycast management node handling the domain resolution will resolve the client to an edge node that the CDN determines is the best to serve that client. The anycast management node in the CDN typically makes this decision based on a network topology map, node health, and load characteristics. This requires the anycast management node of the CDN to build a map of the network topology. Using this network map in combination with the health of the nodes allows the anycast management node of the CDN to make intelligent decisions for routing the client to closest and healthiest edge node.

This disclosure includes the observation that these network maps can be complex and the CDN itself makes these decisions based on the client's source IP address. Using the source IP is becoming less reliable as there are ways that clients are tunneling through other networks (VPN, Apple Private Relay) or the IP addresses are registered incorrectly with internet registries. This is where anycast client routing as discussed herein can be very valuable as the anycast management node of the CDN does not need to maintain a network map for making client routing decisions but typically using anycast removes the ability for a CDN to route clients based on the health of the edge nodes. Embodiments herein include a way to combine anycast client routing with centralized health management via DNS.

More specifically, embodiments herein include incorporating a proxy server hosting an anycast IP address with each CDN edge cluster. The CDN edge nodes would host unicast IPs (network addresses) and would be managed by a centralized CDN control plane that monitors health and load of all edge nodes in different edge node clusters. Clients making a request to the CDN would be pointed/redirected to a DNS A/AAAA record that resolves to the anycast address hosted by the anycast proxies (a.k.a., anycast management nodes) that reside at each CDN edge cache location. The clients (such as communication devices) will then make an HTTP GET request to the anycast IP and, due to the nature of anycast routing, the client will be routed to the nearest anycast proxy node. As discussed herein, that anycast proxy node will respond with an HTTP redirect for any request it receives. The HTTP redirect will point to a DNS record for the CDN edge cache cluster that the anycast proxy resides with. The client will then resolve the DNS record they were redirected to by the anycast proxy node. Yet further as discussed herein, the DNS record is owned by the CDN centralized control plane, which will resolve the client to the healthiest edge node in the edge cluster. Then, the client will make an HTTP GET request to the unicast address assigned to the node in the edge cluster that they were resolved to.

Accordingly, the content distribution system as discussed herein includes one or more instances of communication management hardware. The communication management hardware tracks a status of multiple different groupings of edge nodes in a content delivery network. Each of the edge nodes is operative to distribute content (such as video content, video segments, digital assets, etc.) in a network environment. The communication management hardware as discussed herein tracks a first content distribution (delivery) status of a first group of network nodes (such as first content distribution edge nodes) assigned and thus managed by a first anycast management node; the communication management hardware tracks a second content distribution (delivery) status of a second group of network nodes (such as second content distribution edge nodes) assigned and thus managed by a second anycast management node; and so on. In response to receiving a request originating from a communication device for assignment of a resource (such as an edge node in any of the groups or a particular group) from which to retrieve content, the communication management hardware selects an identity of an appropriate network node from amongst a combination of all of the groups such as from the first group and the second group. The communication management hardware then communicates an identity of the selected content distribution network node (such as a selected edge node having the ability to serve the content requested by the client communication device) to the communication device. In a manner as previously discussed, the communication device then communicates with the selected network node as specified by the redirect to retrieve the content.

In accordance with further example embodiments, the system as discussed herein provides improved use of distributing content in a network environment. For example, as previously discussed, a network environment can be configured to include a communication device and multiple resources such as edge nodes from which to retrieve content. Assume that the communication device transmits a request for content (such as in accordance with an anycast protocol) in a network environment. Assume further that the request for content is received by a first anycast node of multiple anycast nodes in the network environment. In response to transmitting the request for retrieval of content in the network environment, the communication device receives a redirect response from a first anycast node in the network that receives the request. In accordance with the redirect response from the first anycast node, the communication device communicates a redirect message to management hardware in the network environment as specified by the redirect message. The management hardware (such as a content delivery network control plane or other suitable entity) facilitates or globally manages distribution of content and load balancing in the network environment from multiple edge node resources (or clusters of edge nodes) associated with the multiple anycast nodes. In response to communicating the redirect message to the management hardware, the communication device receives an identity of a selected network node (such as a particular edge node managed by the first anycast node or a second anycast node) from which to retrieve the content.

As further discussed herein, the loads associated with each of the edge nodes may change over time. The operation of selecting a respective edge node from multiple edge nodes is repeated over time for each of multiple communication devices accessing the content delivery network to balance data distribution by each of the edge nodes. In other words, the centralized management resource (communication management hardware) as discussed herein can be configured to repeatedly select amongst different edge nodes for use by different communication devices to balance data distribution from the edge nodes to the communication devices over time.

Additionally, as further discussed herein, the communication management resource providing notification of an anycast node from which to retrieve content can be configured to learn of a respective location associated with a communication device requesting content. The communication management resource can be configured to distribute location specific URLs to the requesting communication device based on a known location associated with the communication device as an alternative to providing an anycast node to the communication device and the anycast node redirecting the communication device to the content delivery network control plane.

Now, more specifically, FIG. 1 is an example diagram illustrating a network environment supporting monitoring of network nodes and content distribution as discussed herein.

As shown in this example, network environment 100 includes network 190, communication management resource 140 (such as an application backend, streaming back office, and/or other suitable entity), communication management resource 141 (such as a domain name server or other suitable entity), communication management resource 151 (such as a so-called content distribution network control plane or other suitable entity), and content distribution network 101.

In one example, each communication device in network environment 100 is mobile or stationary with respect to a wireless station (such as wireless access point, wireless base station, etc.) in the network environment 100. The location of a communication device in the network environment 100 can be used as a basis to select which of the edge nodes in the content delivery network 101 delivers respective data (requested content) to the communication device.

Note that each of the entities such as communication management resource 140, management resource 141, communication management resource 151, communication management resource 152, communication management resource 153, content distribution network 101, etc., can be implemented in any suitable manner.

For example, the communication management resource 140 can be implemented as communication management hardware, communication management software, or a combination of communication management hardware and communication management software; the communication management resource 141 can be implemented as communication management hardware, communication management software, or a combination of communication management hardware and communication management software; the communication management resource 151 can be implemented as communication management hardware, communication management software, or a combination of communication management hardware and communication management software; the communication management resource 152 can be implemented as communication management hardware, communication management software, or a combination of communication management hardware and communication management software; the communication management resource 153 can be implemented as communication management hardware, communication management software, or a combination of communication management hardware and communication management software; content distribution network 101 can be implemented as content distribution hardware, content distribution software, or a combination of communication management hardware and communication management software; and so on.

In this example, the content distribution network 101 includes multiple groupings or clusters of content distribution resources at different locations in the network environment 100. Each of the anycast management nodes (anycast proxy node) such as anycast management node 121, anycast management node 122, anycast management node 123, and anycast management node 124 is assigned a same network address such as XXXA. If a client communicates a request in content delivery network 101 for content to the network address XXXA, the content distribution network 101 and corresponding routers routes the request to the anycast management node nearest to the requesting client device generating the content request.

Further in this example, a first cluster of resources 102-1 at or around location L1 (a.k.a., geographical region L1) in the content distribution network 101 includes anycast management node 121 (assigned anycast network address XXXA), resource POP-A (such as a first Point of Presence Server), and multiple content distribution edge nodes A1, A2, A3, etc. The anycast management node 121 can be configured to at least partially manage operation of the different edge nodes A1, A2, A3, etc., such as distribution of content from the edge nodes to one or more communication devices in the network environment 100.

A second cluster of resources 102-2 at or around location L2 (a.k.a., geographical region L2) in the content distribution network 101 includes anycast management node 122 (assigned anycast network address XXXA), resource POP-B (such as a second Point of Presence Server), and multiple edge nodes B1, B2, B3, etc. The anycast management node 122 can be configured to at least partially manage operation of the different content distribution edge nodes B1, B2, B3, etc., such as distribution of content from the edge nodes to one or more communication devices in the network environment 100.

A third cluster of resources 102-3 at or around location L3 (a.k.a., geographical region L3) in the content distribution network 101 includes anycast management node 123 (assigned anycast network address XXXA), resource HUB-A, and multiple edge nodes C1, C2, C3, etc. The anycast management node 123 can be configured to at least partially manage operation of the different content distribution edge nodes C1, C2, C3, etc., such as distribution of content from the edge nodes to one or more communication devices in the network environment 100.

A fourth cluster of resources 102-4 at or around location L4 (a.k.a., geographical region L4) in the content distribution network 101 includes anycast management node 124 (assigned network address XXXA), resource HUB-B, and multiple edge nodes D1, D2, D3, etc. The anycast management node 124 can be configured to at least partially manage operation of the different content distribution edge nodes D1, D2, D3, etc., such as distribution of content from the edge nodes to one or more communication devices in the network environment 100.

As further shown, the communication management resource 151 includes communication management resource 152 (such as a health monitor resource, and/or other suitable entity). During operation, the communication management resource 152 monitors each of the clusters and generates respective (health) status information 196 indicating respective statuses of the different resources in the content distribution network 101.

The communication management resource 152 can be configured to generate the health status associated with each of the edge nodes in the content delivery network 101 in any suitable manner. For example, the communication management resource 152 can be configured to communicate with each of the anycast management nodes associated with a cluster to determine a respective capability of each of the corresponding edge nodes in the cluster to deliver content to one or more content requesting communication devices.

More specifically, the anycast management node 121 or other suitable entity can be configured to monitor outflow data distribution capabilities of the edge nodes A1, A2, A3, etc., in cluster 102-1 for delivery of content to newly requesting communication devices or newly requested content delivery tasks. Further, the communication management resource 152 can be configured to communicate with the anycast management node 121 to retrieve the throughput capability information (indicating an ability of the edge nodes to handle new content delivery tasks) associated with each of the edge nodes A1, A2, A3, etc. Additionally, or alternatively, the communication management resource 152 can be configured to communicate directly with each of the respective edge nodes A1, A2, A3, etc., to retrieve status information, learning of any excess capability of those edge nodes to handle new content delivery tasks and deliver content from the content delivery network 101 in accordance with the newly received content requests.

The anycast management node 122 or other suitable entity can be configured to monitor data flow capabilities of the edge nodes B1, B2, B3, etc., in cluster 102-2 for delivery of content to newly requesting communication devices. Further, the communication management resource 152 can be configured to communicate with the anycast management node 122 to retrieve the throughput capability information (indicating an ability of the edge nodes to handle new content delivery tasks) associated with each of the edge nodes B1, B2, B3, etc. Additionally, or alternatively, the communication management resource 152 can be configured to communicate directly with each of the respective edge nodes B1, B2, B3, etc., to learn of any excess capability of those edge nodes to handle new content delivery tasks and deliver content from the content delivery network 101 in accordance with those newly received content requests.

The anycast management node 123 can be configured to monitor data flow capabilities of the edge nodes C1, C2, C3, etc., in cluster 102-3 for delivery of content to newly requesting communication devices. Further, the communication management resource 152 can be configured to communicate with the anycast management node 123 to retrieve the throughput capability information (indicating an ability of the edge nodes to handle new content delivery tasks) associated with each of the edge nodes C1, C2, C3, etc. Additionally, or alternatively, the communication management resource 152 can be configured to communicate directly with each of the respective edge nodes C1, C2, C3, etc., to learn of any excess capability of those edge nodes to handle new content delivery tasks and deliver content from the content delivery network 101 in accordance with those newly received content requests.

The anycast management node 124 can be configured to monitor data flow capabilities of the edge nodes D1, D2, D3, etc., in cluster 102-4 for delivery of content to newly requesting communication devices. Further, the communication management resource 152 can be configured to communicate with the anycast management node 124 to retrieve the throughput capability information (indicating an ability of the edge nodes to handle new content delivery tasks) associated with each of the edge nodes D1, D2, D3, etc. Additionally, or alternatively, the communication management resource 152 can be configured to communicate directly with each of the respective edge nodes D1, D2, D3, etc., to learn of any excess capability of those edge nodes to handle new content delivery tasks and deliver content from the content delivery network 101 in accordance with those newly received content requests.

Accordingly, the communication management resource 152 can be configured to determine the ability (such as health status) of each of the different edge nodes to handle new delivery content tasks associated with the clusters and corresponding edge nodes in multiple different ways.

As further discussed herein, the communication management resource 153 (such as a so-called DNS NS or Domain Name Server NameServer and/or other suitable entity) uses the stores status information 196 as a basis to select an appropriate content distribution network node to serve content to a requesting client device (a.k.a., communication device and/or other suitable entity).

Figure 2:
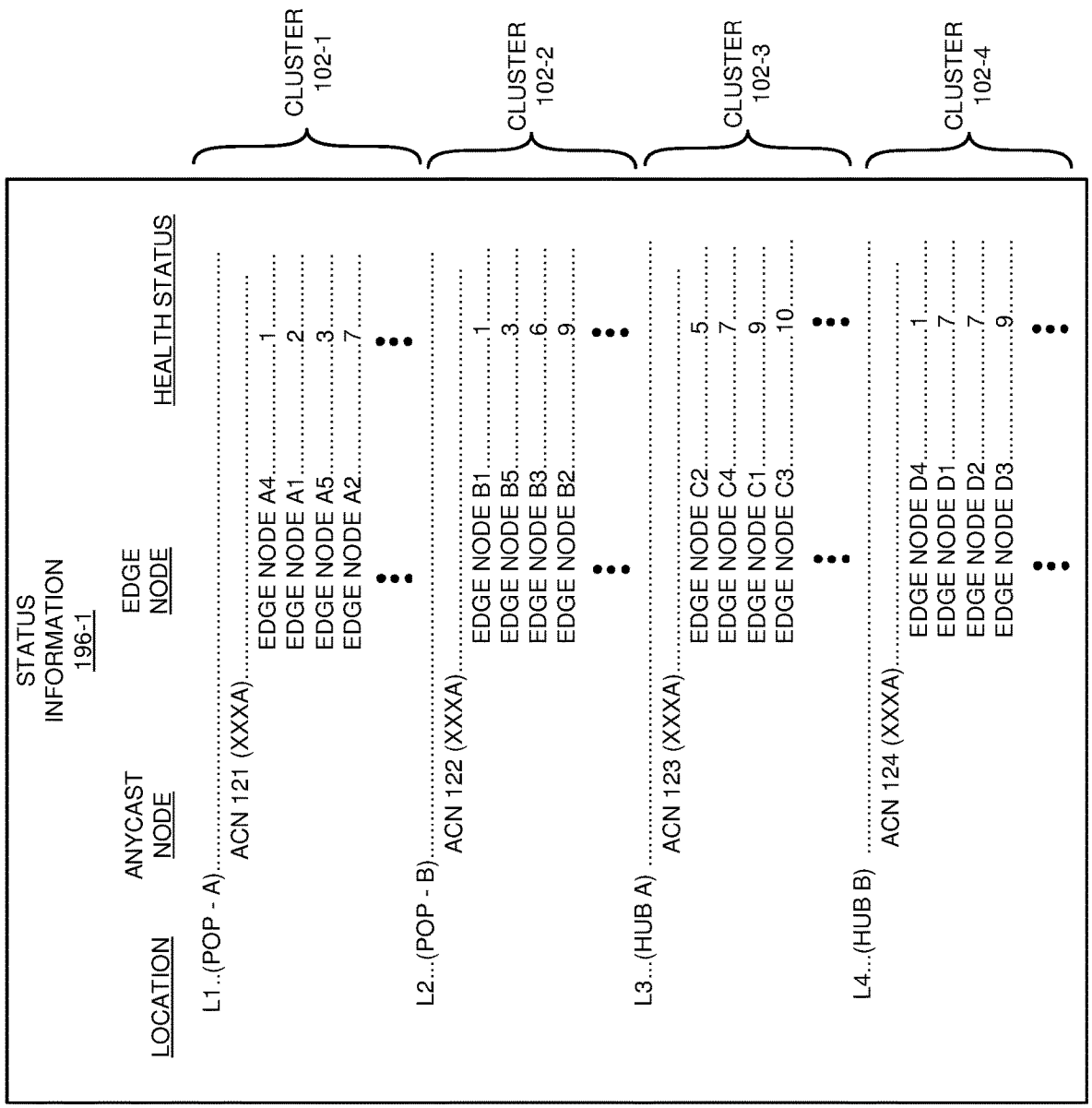
FIG. 2 is an example diagram illustrating status information (such as health) associated with content distribution network nodes as discussed herein.

FIG. 2 is an example diagram illustrating status information (such as health) associated with content distribution network nodes as discussed herein.

As previously discussed, the communication management resource 152 generates the status information 196 to track the health of the different network resources in the content distribution network 101 and their ability to handle new content delivery tasks of delivering requested content to each of one or more communication devices. Note that the communication management resource 152 constantly updates the delivery status information 196 over time because the delivery of content and corresponding ability to handle new content delivery tasks by the edge nodes changes over time, sometimes quickly. Status information 196-1 in FIG. 2 illustrates the collective delivery status associated with the different edge nodes at or around time T1.

More specifically, in this example, the status information 196-1 indicates that multiple edge nodes A1, A2, A3, A4, etc., reside at the location L1 and are managed by the anycast management node 121. The communication management resource 152 assigns a health status to each of the edge nodes A1, A2, A3, A4, etc., in cluster 102-1. The health status can be or include one or more numerical values indicating an ability of the respective edge node to deliver content to a requesting communication device. The health status (i.e., performance status) can depend on any of one or more parameters such as free bandwidth capacity of the respective edge node to handle new tasks of communicating content to communication devices, number of communication devices currently supported by the edge node, processing capacity associated with the respective edge node, etc.

In this example, assume that the magnitude of the health status (or performance status) value may range or scale from 1 to 10, where assignment of the value 1 indicates a highest ability (low congestion) of the respective edge node to handle a new task of delivering requested content from the content delivery network 101, and where assignment of the value 10 indicates (high congestion) a lowest ability of the respective edge node to handle a new task of delivering requested content from the content delivery network 101.

For example, assume that the communication management resource 152 determines from monitoring that the edge node A4 has a very high ability to handle a new content delivery task of communicating content to a respective communication device in the network 100. In such an instance, the communication management resource 152 assigns the performance status value (health status) of 1 to the edge node A4.

Assume further that the communication management resource 152 determines from monitoring that the edge node A1 has a very high ability to deliver content to a respective communication device. In such an instance, based on the determined ability to handle a new content delivery task, the communication management resource 152 assigns the performance status value (health status or delivery performance status) of 2 to the edge node A1.

Assume further that the communication management resource 152 determines from monitoring that the edge node A5 has a good ability to deliver content to a respective communication device. In such an instance, based on the determined ability to handle a new content delivery task, the communication management resource 152 assigns the performance status value (health status or delivery performance status) of 3 to the edge node A1.

The assignment of health status to each of the edge nodes results in a ranking of the edge nodes and their ability to deliver content to new communication devices requesting content from the content delivery network 101. For example, the status information 196-1 indicates the ranking of edge nodes at cluster 102-1 as follows: edge node A4 is the best candidate to support a new task/request for delivering content; edge node A1 is a next best candidate to support a new request for delivering content; edge node A5 is the next best candidate to support a new request for delivering content; edge node A2 is a next best candidate to support a new request for delivering content; and so on. In general, the ranking of the edge nodes at different ranking levels indicates an imbalance of the edge nodes delivering content in the network environment. As further discussed herein, selection of the best candidates to handle new content delivery requests helps to balance delivery of content from each of the edge nodes to be more uniform.

As further shown, the status information 196-1 indicates that multiple edge nodes B1, B2, B3, B4, etc., reside at the location L2 in the network environment 100 and are managed by the anycast management node 122. The communication management resource 152 assigns a health status to each of the edge nodes B1, B2, B3, B4, etc., in cluster 102-2. The health status can be or include one or more numerical values indicating an ability of the respective edge node to deliver content to a requesting communication device. The health status (i.e., performance status or delivery performance status) can depend on any of one or more parameters such as free capacity of the respective edge node to handle new tasks of communicating content to communication devices, number of communication devices currently supported by the edge node, processing capacity associated with the respective edge node, etc.

In a similar manner as previously discussed, the magnitude of the health status (or performance status) value may range or scale from 1 to 10, where assignment of the value 1 indicates a highest or best ability of the respective edge node to handle a new task of delivering requested content from the content delivery network 101, and where assignment of the value 10 indicates a lowest ability of the respective edge node to handle a new task of delivery requested content from the content delivery network 101.

Assume that the communication management resource 152 determines from monitoring that the edge node B1 has a very high ability to handle a new content delivery task of communicating content to a respective communication device. In such an instance, the communication management resource 152 assigns the performance status value (health status) of 1 to the edge node B1.

Assume further that the communication management resource 152 determines from monitoring that the edge node B5 has a very high ability to deliver content to a respective communication device. In such an instance, based on the determined ability to handle a new content delivery task, the communication management resource 152 assigns the performance status value (health status) of 3 to the edge node B5.

Assume further that the communication management resource 152 determines from monitoring that the edge node B3 has a moderate ability to deliver content to a respective communication device. In such an instance, based on the determined ability to handle a new content delivery task, the communication management resource 152 assigns the performance status value (health status) of 6 to the edge node B3.

In this manner, the communication management resource 152 rates each of the edge nodes.

The assignment of health status to each of the edge nodes results in a ranking of the edge nodes and their ability to deliver content to new communication devices requesting content from the content delivery network 101. For example, the status information 196-1 indicates the ranking of edge nodes at cluster 102-2 as follows: edge node B1 is the best candidate to support a new request for delivering content for cluster 102-2; edge node B5 is a next best candidate to support a new request for delivering content; edge node B3 is the next best candidate to support a new request for delivering content; edge node B2 is a next best candidate to support a new request for delivering content; and so on.

As further shown, the status information 196-1 indicates that multiple edge nodes C1, C2, C3, C4, etc., reside at the location L3 in the network environment 100 and are managed by the anycast management node 123. The communication management resource 152 assigns a health status to each of the edge nodes C1, C2, C3, C4, etc., in cluster 102-3. The health status can be or include one or more numerical values indicating an ability of the respective edge node to deliver content to a requesting communication device. The health status (i.e., delivery performance status) can depend on any of one or more parameters such as free capacity of the respective edge node to handle new tasks of communicating content to communication devices, number of communication devices currently supported by the edge node, processing capacity associated with the respective edge node, etc.

In a similar manner as previously discussed, the magnitude of the health status (or performance status) value may range or scale from 1 to 10, where assignment of the value 1 indicates a highest ability of the respective edge node to handle a new task of delivery requested content from the content delivery network 101, and where assignment of the value 10 indicates a lowest ability of the respective edge node to handle a new task of delivery requested content from the content delivery network 101.

For example, assume that the communication management resource 152 determines from monitoring that the edge node C2 has a moderate ability to handle a new content delivery task of communicating content to a respective communication device. In such an instance, the communication management resource 152 assigns the performance status value (health status) of 5 to the edge node C2.

Assume further that the communication management resource 152 determines from monitoring that the edge node C4 has a less than moderate ability to deliver content to a respective communication device. In such an instance, based on the determined ability to handle a new content delivery task, the communication management resource 152 assigns the performance status value (health status) of 7 to the edge node C4.

Assume further that the communication management resource 152 determines from monitoring that the edge node C1 has a very poor ability to deliver content to a respective communication device because edge node C1 is currently overloaded. In such an instance, based on the determined ability to handle a new content delivery task, the communication management resource 152 assigns the performance status value (health status) of 9 to the edge node C1.

Assume further that the communication management resource 152 determines from monitoring that the edge node C3 has a poor ability to deliver content to a respective communication device because edge node C3 is currently overloaded. In such an instance, based on the determined ability to handle a new content delivery task, the communication management resource 152 assigns the performance status value (health status) of 10 to the edge node C3. In this manner, the communication management resource 152 rates each of the edge nodes.

The assignment of health status to each of the edge nodes results in a ranking of the edge nodes and their ability to deliver content to new communication devices requesting content from the content delivery network 101. For example, the status information 196-1 indicates the ranking of edge nodes at cluster 102-3 as follows: edge node C2 is the best candidate in cluster 102-3 to support a new request for delivering content; edge node C4 is a next best candidate to support a new request for delivering content; edge node C1 is the next best candidate to support a new request for delivering content; edge node C3 is a next best candidate to support a new request for delivering content; and so on.

As further shown, the status information 196-1 indicates that multiple edge nodes D1, D2, D3, D4, etc., reside at the location L4 in the network environment 100 and are managed by the anycast management node 124. The communication management resource 152 assigns a health status to each of the edge nodes D1, D2, D3, D4, etc., in cluster 102-4. The health status can be or include one or more numerical values indicating an ability of the respective edge node to deliver content to a requesting communication device. The health status (i.e., performance status) can depend on any of one or more parameters such as free capacity of the respective edge node to handle new tasks of communicating content to communication devices, number of communication devices currently supported by the edge node, processing capacity associated with the respective edge node, etc.

In a similar manner as previously discussed, the magnitude of the health status (or performance status) value may range or scale from 1 to 10, where assignment of the value 1 indicates a highest ability of the respective edge node to handle a new task of delivering requested content from the content delivery network 101, and where assignment of the value 10 indicates a lowest ability of the respective edge node to handle a new task of delivery requested content from the content delivery network 101.

For example, assume that the communication management resource 152 determines from monitoring that the edge node D4 has free bandwidth and is a very good ability to handle a new content delivery task of communicating content to a respective communication device. In such an instance, the communication management resource 152 assigns the performance status value (health status) of 1 to the edge node D4.

Assume further that the communication management resource 152 determines from monitoring that the edge node D1 has a less than moderate (poor) ability to deliver content to a respective communication device. In such an instance, based on the determined ability to handle a new content delivery task, the communication management resource 152 assigns the performance status value (health status) of 7 to the edge node D1.

Assume further that the communication management resource 152 determines from monitoring that the edge node D2 has a poor ability to deliver content to a respective communication device. In such an instance, based on the determined ability to handle a new content delivery task, the communication management resource 152 assigns the performance status value (health status) of 7 to the edge node D2.

Assume further that the communication management resource 152 determines from monitoring that the edge node D3 has a very poor ability to deliver content to a respective communication device. In such an instance, based on the determined ability to handle a new content delivery task, the communication management resource 152 assigns the performance status value (health status) of 9 to the edge node D3. In this manner, the communication management resource 152 rates each of the edge nodes.

The assignment of health status to each of the edge nodes results in a ranking of the edge nodes and their ability to deliver content to new communication devices requesting content from the content delivery network 101. For example, the status information 196-1 indicates the ranking of edge nodes at cluster 102-4 as follows: edge node D4 is the best candidate in cluster 102-4 to support a new request for delivering content; edge node D1 is a next best candidate to support a new request for delivering content; edge node D2 is the next best candidate to support a new request for delivering content; edge node D3 is a next best candidate to support a new request for delivering content; and so on.

Referring again to FIG. 1, the communication management resource 151 and the communication management resource 153 uses the generated status information 196 to control delivery of content by the edge nodes in the content delivery network 101. Details are discussed in FIGS. 3 and 4.

Figure 3:
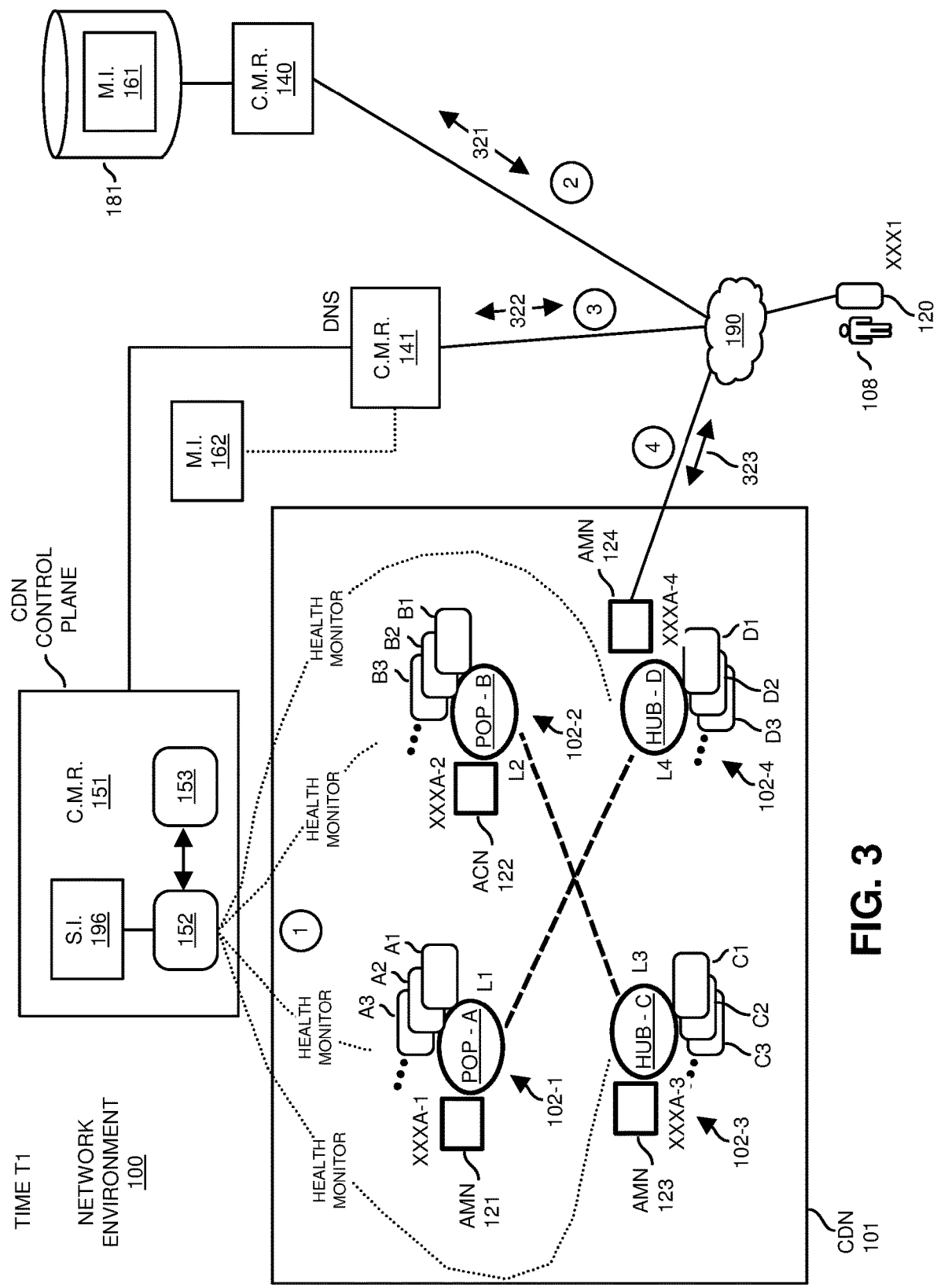
FIG. 3 is an example diagram illustrating operations associated with redirecting a client device to an appropriate edge network node to retrieve content as discussed herein.

FIG. 3 is an example diagram illustrating operations associated with redirecting a client device to an appropriate edge network node to retrieve content as discussed herein.

As previously discussed, via operation #1, the communication management resource 152 tracks a status of multiple different groupings (clusters) of edge nodes, each of which is operative to distribute content (such as video content, segments of video content, digital assets, etc.) in a network environment. For example, via status information 196-1, the communication management resource 152 tracks a first content distribution status of a first cluster 102-1 (group) of network nodes (such as first content distribution edge nodes A1, A2, A3, etc.) assigned and thus managed by a first anycast management node 121; the communication management resource 152 tracks a second content distribution status of a second group (cluster 102-2) of network nodes (such as second content distribution edge nodes B1, B2, B3, etc.) assigned and thus managed by a second anycast management node 122; and so on.

As further shown, the user 108 operates the communication device 120. Assume in this example, in operation #2, at or around time T1, based on input from the user 108, the communication device 120 communicates a respective request for a specific title of content to the communication management resource 140 (such as a so-called streaming back office, application backend, etc.) via communications 321 from the communication device 120 over network 190 to the communication management resource 140. The request received by the communication management resource 140 from the communication device 120 prompts the communication management resource 140 to determine if the communication device 120 and corresponding user 108 are authorized to receive content from the content delivery network 101. The repository 181 stores map information indicating which of multiple different URLs is to be used to retrieve the requested content from the content delivery network 101.

Assuming that the communication management resource 140 determines that the communication device 120 and corresponding user 108 are authorized to retrieve content requested by the communication device, in response to receiving the request for content originating from the communication device 120 for assignment of a resource (such as an edge node in any of the groups or anycast management node) from which to retrieve or request retrieval of content, the communication management resource 140 selects and communicates a URL and/or network address of an appropriate resource to be used by the communication device 120 to retrieve the requested content. Assume that each of the anycast management nodes assigned network address XXXA are configured to distribute the requested content (such as requested content A) to the communication device 120. In such an instance, via communications 321, the communication management resource 140 communicates (such as in a CDN streaming URL response) a specific URL (Uniform Resource Locator) such as URL-A associated with the network address XXXA to the communication device 120.

The communication device 120 then uses the AC-URL-A received from the communication management resource 140 as a basis in which to retrieve the respective content. For example, in operation #3, via communications 322, the communication device 121 forwards the respective URL-A (and potentially additional information indicating the requested content A) to the communication management resource 141 (such as a domain name server, URL to network address translator, or other suitable entity). The communication management resource 141 translates (or maps) the received request associated with URL-A into an appropriate destination network address such as XXXA to be used by the communication device 122 retrieve the requested content from the content delivery network 101. Further, via communications 322, the communication management resource 141 forwards the network address XXXA (such as an anycast proxy Internet Protocol or IP address) in a response via communications 322 to the communication device 120.

As further shown, in operation #4, via communications 323, the communication device 120 generates and communicates a respective content request (such as request for content A) directed to the network address XXXA received from the communication management resource 141.

As previously discussed, the content delivery network 101 can be configured to route the content request to network address XXXA in accordance with an anycast routing protocol. For example, the content delivery network 101 routes the content request from the communication device 120 to the cluster 102-4 and corresponding anycast management node 124 because it (anycast management node 124) is nearest to the communication device 120. Thus, in response to receiving the content request (such as network XXXA and an identifier of the requested content A) from the communication device 120 directed to the target/destination network address XXXA, the content delivery network 101 routes the request for content by the communication device to the nearest cluster and/or resource in the content delivery network 101. This happens to be the cluster 102-4. In one embodiment, the content delivery network 101 delivers the request for content (such as based on a HTTP Get Request for the content communicated from the communication device 120 to the anycast management node 124) from the communication device 120 in communications 323 to the anycast management node 124.

Still further, in operation #4, rather than the anycast management node 124 notifying or redirecting the communication device 120 of a particular edge node in cluster 102-4 from which to retrieve the requested content, the anycast management node 124 redirects the communication device 120 to the (global) communication management resource 151 to determine an appropriate edge node from which the communication device 120 is to retrieve the requested content.

More specifically, via communications 323, the anycast management node 124 generates a redirect response and communicates it to the communication device 120. The communication device 120 receives the redirect response from the anycast management node 124. In accordance with the redirect response from the anycast management node 124, the communication device 120 communicates a further redirect message to the communication management resource 141 in operation #5 of FIG. 4 to resolve the FQDN (fully qualified domain name) redirect response received from the anycast management node 124 in operation #4.

Figure 4:
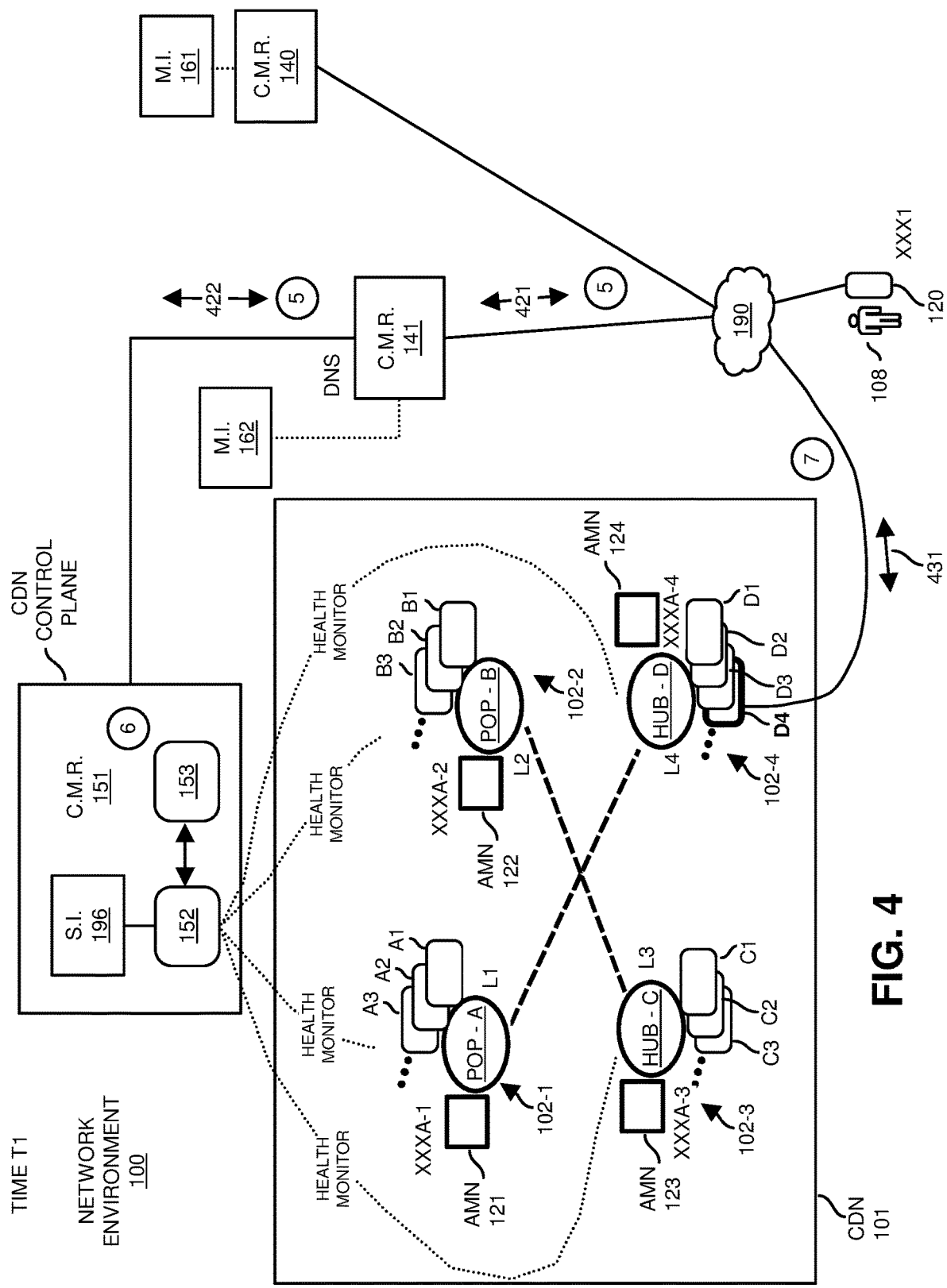
FIG. 4 is an example diagram illustrating operations associated with redirecting a client device to an appropriate edge network node to retrieve content as discussed herein.

Further operations are discussed in FIG. 4 and corresponding text.

FIG. 4 is an example diagram illustrating operations associated with redirecting a client device to an appropriate edge network node to retrieve content as discussed herein.

More specifically, in operation #5, via communications 421, in response to receiving the redirect response from the anycast management node 124, the communication device 120 communicates a redirect message to the communication management resource 141. The redirect message in communications 421 to the communication management resource 141 can be configured to include any suitable information such as a unique identifier value indicating the unique identity of the anycast management node 124, location L4 of the cluster 102-4 and/or anycast management node 124, etc., or other suitable information.

The communication management resource 141 (such as management hardware) facilitates or manages distribution of content in the network environment 100 from multiple resources (such as different clusters 102-1, 102-2, 102-3, 102-4, etc.) associated with the multiple anycast nodes. For example, in response to receiving the redirect message from the communication device 120 in communications 421, further in operation #5, the communication management resource 141 communicates a message associated with the redirect message to the communication management resource 153.

In processing operation #6, the communication management resource 151 determines a best edge node from which the communication device 120 is to retrieve the requested content. Thus, instead of the anycast management node 124 deciding which edge node is to be used to deliver the content to the communication device 120, the communication management resource 151 and/or communication management resource 153 determines the best edge node in any of the clusters from which to assign to the communication device 120 based on analysis of the status information 196-1.

More specifically, as previously discussed, the communication management resource 151 tracks the content distribution status (such as ability for each of the content distribution network nodes to distribute content) in the network environment. The communication management resource 152 produces, for each of the clusters, a ranking of the different edge nodes and their ability to distribute content to the communication device 120 or other communication devices in the network environment 100.

As further discussed herein, the communication management hardware uses the ranking as a basis to select the identity of the network node from the first group.

More specifically, assume that the communication management resource 153 determines from communications 422 that the communication device 120 is nearest to the cluster 102-4. This determination can be achieved in any suitable manner. For example, the communications from the communication device 120 may indicate the identity of the anycast management node 124. The communication management resource 151 and communication management resource 153 knows the location of the anycast management node 124 and corresponding available edge nodes D1, D2, D3, etc., associated with the cluster 102-4 and anycast management node 124 at location L4. In other words, the communication management resource can be configured to map the identity of the anycast management node 124 to the location L4 and/or corresponding cluster 102-4. Because the edge nodes are near the communication device 120, the edge nodes in cluster 102-4 therefore may be the best edge nodes from which to select an edge to support distribution of the requested content to the communication device 120.

The communication management resource 153 and 151 can be configured to consider which of the multiple content distribution network nodes (edge nodes) in the cluster 102-4 is best suited to deliver the requested content to the communication device 120. The status information 196-1 in FIG. 3 indicates that ranked edge node D4 is a best candidate amongst multiple candidate edge nodes in which to select for use by the communication device 120 to retrieve the requested content. In such an instance, assume that the communication management resource 150 selects the edge node D4 for use by the communication device 120 because it is the best edge node and potentially only good candidate edge node available in that cluster 102-4. In such an instance, via communications 422, the communication management resource 153 communicates the identity of the selected edge node D4 to the communication management resource 141. Further, via communications 421, the communication management resource 141 forwards the identity of the selected edge node D4 (and specific unicast network address of the edge node D4) to the communication device 120.

As further shown, in processing operation #7, and via corresponding communications 431, and based on the specific unicast network address assigned to the edge node D4, the communication device 120 communicates a respective request for the content directly to the selected edge node D4. The edge node D4 retrieves the requested content from one or more repositories in the content delivery network 101 and communicates the requested content to the communication device 120.

Note that the communications may support multiple requests communicated from the communication device 120 to the edge node D4 for a duration of time such as 10 seconds or other suitable amount of time. The edge node D4 responds with appropriate requested content communicated to the communication device 120.

It should be noted that the operations as described herein support load-balancing amongst the different edge nodes within a respective cluster as well as load-balancing amongst edge nodes and all of the clusters. In other words, the above example, the communication management resource 153 has a global overview of the abilities of each of the clusters and corresponding edge nodes to handle new content request tasks. The selection of the edge node D4 in the above example helps to equalize distribution of content from each of the edge nodes in the cluster 102-4. More specifically, the edge node D4 at location has extra bandwidth capability to communicate requested content to one or more communication devices because it ranked highest on list (such as because it is least used amongst the edge nodes in cluster 102-4). Assignment of the edge node D4 to service the content requests from the communication device 120 helps to balance the load of handling content distribution requests from multiple communication devices in communication with cluster 102-4.

As previously discussed, the communication management resource 151 and corresponding resources have an overview of the status of all clusters and edge nodes. As further discussed herein in the following FIGS. 5-7, note that if none of the content distribution network nodes (edge nodes) in the original cluster 102-4 group are good candidates in which to distribute requested content, the communication management hardware as discussed herein can be configured to consider another group of content distribution network nodes in a vicinity of the communication device in which to select and assign for use by the communication device 120 to retrieve requested content.

Figure 5:
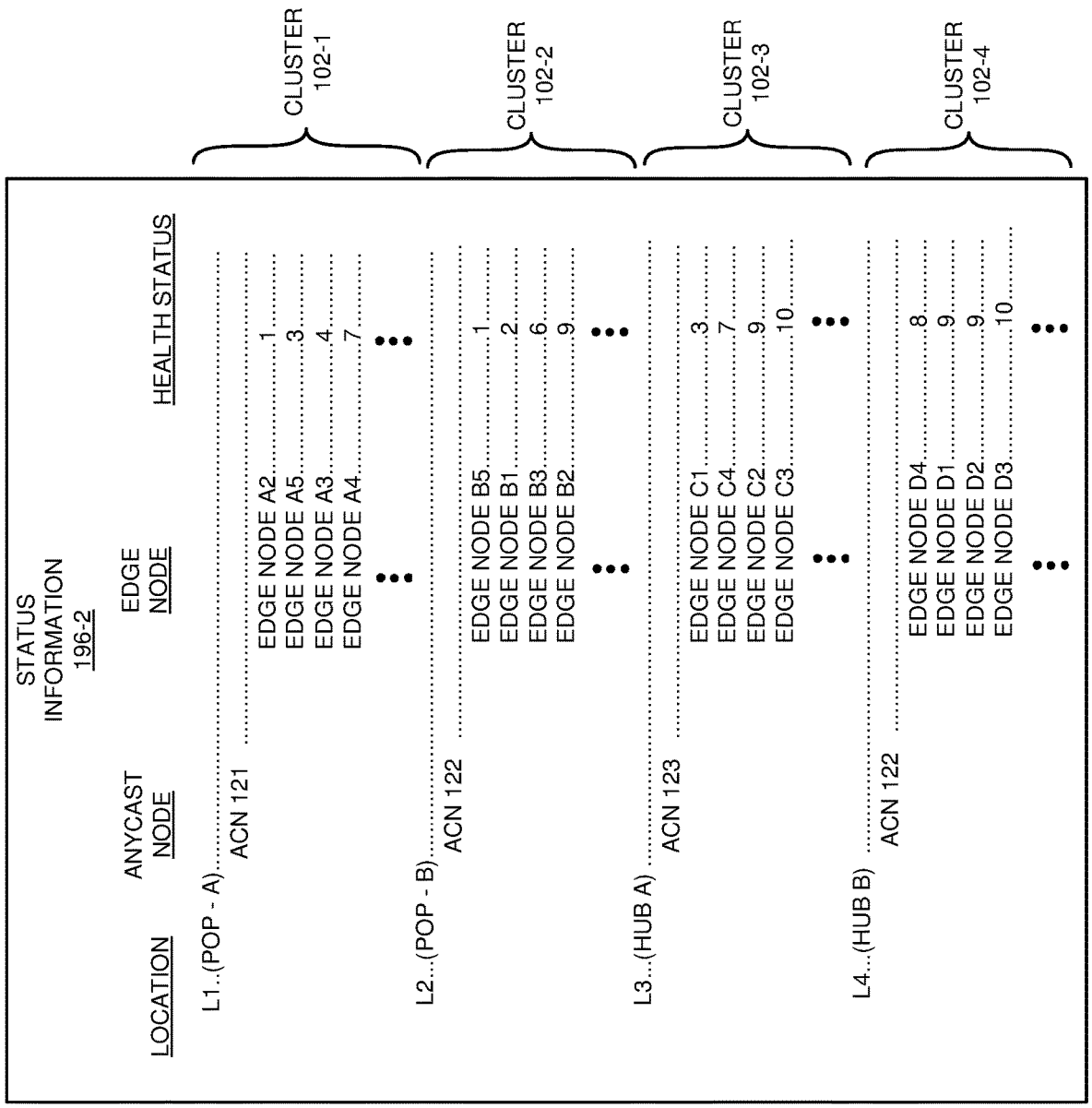
FIG. 5 is an example diagram illustrating status information (such as health) associated with content distribution network nodes as discussed herein.

FIG. 5 is an example diagram illustrating status information (such as health) associated with content distribution network nodes as discussed herein.

As previously discussed, the communication management resource 152 generates the status information 196 to track the health of the different network resources in the content distribution network 101 and their ability to handle new content delivery tasks of delivering requested content to each of one or more communication devices. Note again that the communication management resource 152 constantly updates the status information 196 over time because the delivery of content and corresponding ability to handle new content delivery tasks by the edge nodes changes over time.

Status information 196-2 illustrates the collective status associated with the different edge nodes at or around time T2. Hence, the status information 196-2 indicates different levels of congestion associated with the respective edge nodes. Note the change in status from FIG. 2 to FIG. 5.

In a manner as previously discussed, assume that the communication management resource 152 determines from monitoring that the edge node A2 has a very high ability to handle a new content delivery task of communicating content to a respective communication device in the network 100. In such an instance, the communication management resource 152 assigns the performance status value (health status) of 1 to the edge node A2.

Assume further that the communication management resource 152 determines from monitoring that the edge node A5 has a fairly high ability to deliver content to a respective communication device. In such an instance, based on the determined ability to handle a new content delivery task, the communication management resource 152 assigns the performance status value (health status) of 3 to the edge node A5.

Assume further that the communication management resource 152 determines from monitoring that the edge node A3 has a good ability to deliver content to a respective communication device. In such an instance, based on the determined ability to handle a new content delivery task, the communication management resource 152 assigns the performance status value (health status) of 4 to the edge node A3.

As previously discussed, the assignment of health status to each of the edge nodes results in a ranking of the edge nodes and their ability to deliver content to new communication devices requesting content from the content delivery network 101. For example, at or around time T2, the status information 196-2 indicates the ranking of edge nodes at cluster 102-1 as follows: edge node A2 is the best candidate to support a new task/request for delivering content; edge node A5 is a next best candidate to support a new request for delivering content; edge node A3 is the next best candidate to support a new request for delivering content; edge node A4 is a next best candidate to support a new request for delivering content; and so on.

In general, as previously discussed, the ranking of the edge nodes at different ranking levels indicates an imbalance of the edge nodes delivering content in the network environment. In other words, edge node A2 is least congested, edge node A5 is next least congested, etc. As further discussed herein, selection of the best candidates to handle new content delivery requests helps to balance delivery of content from each of the edge nodes to be more uniform or, in other words, provide load-balancing.

In a manner as previously discussed, assume that the communication management resource 152 determines from monitoring that the edge node B5 has a very high ability to handle a new content delivery task of communicating content to a respective communication device. In such an instance, the communication management resource 152 assigns the performance status value (health status) of 1 to the edge node B5.

Assume further that the communication management resource 152 determines from monitoring that the edge node B1 has a very high ability to deliver content to a respective communication device. In such an instance, based on the determined ability to handle a new content delivery task, the communication management resource 152 assigns the performance status value (health status) of 2 to the edge node B1.

Assume further that the communication management resource 152 determines from monitoring that the edge node B3 has a moderate ability to deliver content to a respective communication device. In such an instance, based on the determined ability to handle a new content delivery task, the communication management resource 152 assigns the performance status value (health status) of 6 to the edge node B3.

In this manner, the communication management resource 152 rates each of the edge nodes.

The assignment of health status to each of the edge nodes results in a ranking of the edge nodes and their ability to deliver content to new communication devices requesting content from the content delivery network 101. For example, the status information 196-2 at time T2 indicates the ranking of edge nodes at cluster 102-2 as follows: edge node B5 is the best candidate to support a new request for delivering content for cluster 102-2; edge node B1 is a next best candidate to support a new request for delivering content; edge node B3 is the next best candidate to support a new request for delivering content; edge node B2 is a next best candidate to support a new request for delivering content; and so on.

At or around time T2, assume that the communication management resource 152 determines from monitoring that the edge node C1 has a good ability to handle a new content delivery task of communicating content to a respective communication device. In such an instance, the communication management resource 152 assigns the performance status value (health status) of 3 to the edge node C1.

Assume further that the communication management resource 152 determines from monitoring that the edge node C4 has a less than moderate ability to deliver content to a respective communication device. In such an instance, based on the determined ability to handle a new content delivery task, the communication management resource 152 assigns the performance status value (health status) of 7 to the edge node C4.

Assume further that the communication management resource 152 determines from monitoring that the edge node C2 has a poor ability to deliver content to a respective communication device because edge node C2 is currently overloaded. In such an instance, based on the determined ability to handle a new content delivery task, the communication management resource 152 assigns the performance status value (health status) of 9 to the edge node C2.

Assume further that the communication management resource 152 determines from monitoring that the edge node C3 has a poor ability to deliver content to a respective communication device because edge node C3 is currently overloaded. In such an instance, based on the determined ability to handle a new content delivery task, the communication management resource 152 assigns the performance status value (health status) of 10 to the edge node C3. In this manner, the communication management resource 152 rates each of the edge nodes.

The assignment of health status to each of the edge nodes results in a ranking of the edge nodes and their ability to deliver content to new communication devices requesting content from the content delivery network 101. For example, the status information 196-2 indicates the ranking of edge nodes at cluster 102-3 as follows: edge node C1 is the best candidate in cluster 102-3 to support a new request for delivering content; edge node C4 is a next best candidate to support a new request for delivering content; edge node C2 is the next best candidate to support a new request for delivering content; edge node C3 is a next best candidate to support a new request for delivering content; and so on.

At or around time T2, assume that the communication management resource 152 determines from monitoring that the edge node D4 has very low free bandwidth and is a poor candidate to handle a new content delivery task of communicating content to a respective communication device. In such an instance, the communication management resource 152 assigns the performance status value (health status) of 8 to the edge node D4.

Assume further that the communication management resource 152 determines from monitoring that the edge node D1 has a poor ability to deliver content to a respective communication device. In such an instance, based on the determined ability to handle a new content delivery task, the communication management resource 152 assigns the performance status value (health status) of 9 to the edge node D1.

Assume further that the communication management resource 152 determines from monitoring that the edge node D2 has a poor ability to deliver content to a respective communication device. In such an instance, based on the determined ability to handle a new content delivery task, the communication management resource 152 assigns the performance status value (health status) of 9 to the edge node D2.

Assume further that the communication management resource 152 determines from monitoring that the edge node D3 has a very poor (or no) ability to deliver content to a respective communication device. In such an instance, based on the determined ability to handle a new content delivery task, the communication management resource 152 assigns the performance status value (health status) of 10 to the edge node D3. In this manner, the communication management resource 152 rates each of the edge nodes.

The assignment of health status to each of the edge nodes results in a ranking of the edge nodes and their ability to deliver content to new communication devices requesting content from the content delivery network 101. For example, the status information 196-2 indicates the ranking of edge nodes at cluster 102-4 as follows: edge node D4 is the best (although very poor) candidate in cluster 102-4 to support a new request for delivering content; edge node D1 is a next best candidate to support a new request for delivering content; edge node D2 is the next best candidate to support a new request for delivering content; edge node D3 is a next best candidate to support a new request for delivering content; and so on.

Figure 6:
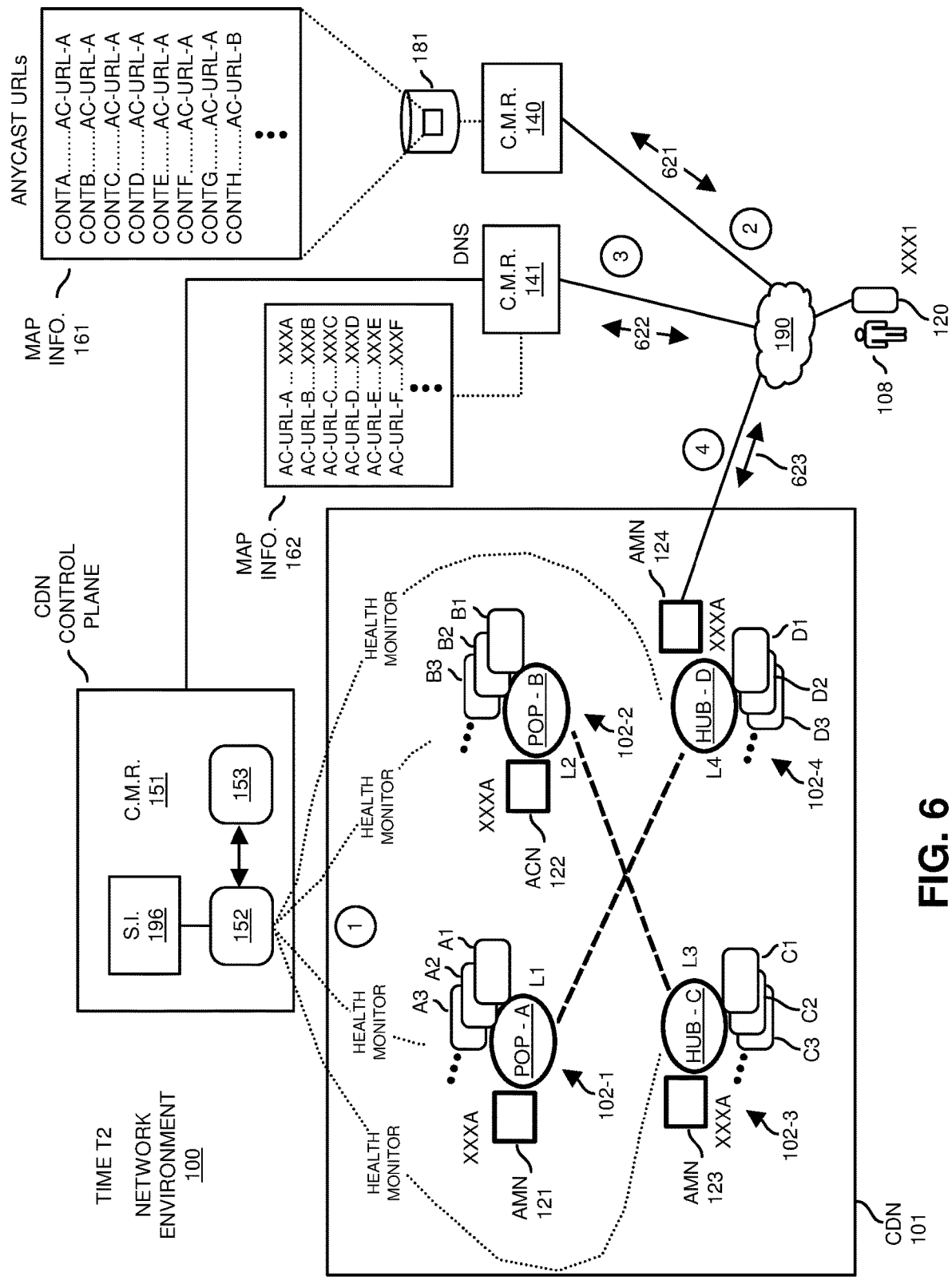
FIG. 6 is an example diagram illustrating operations associated with redirecting a client device to an appropriate edge network node to retrieve content as discussed herein.

FIG. 6 is an example diagram illustrating operations associated with redirecting a client device to an appropriate edge network node to retrieve content as discussed herein.

As previously discussed, via operation #1, the communication management resource 152 tracks a status of multiple different groupings (clusters) of edge nodes, each of which is operative to distribute content (such as video content, segments of video content, digital assets, etc.) in a network environment. For example, via status information 196-2, the communication management resource 152 tracks a first content distribution status of a first cluster 102-1 (group) of network nodes (such as first content distribution edge nodes A1, A2, A3, etc.) assigned and thus managed by a first anycast management node 121; the communication management resource 152 tracks a second content distribution status of a second group (cluster 102-2) of network nodes (such as second content distribution edge nodes B1, B2, B3, etc.) assigned and thus managed by a second anycast management node 122; and so on.

As further shown, the user 108 operates the communication device 120. Assume in this example, in operation #2, at or around time T2, based on input from the user 108, the communication device 120 communicates a respective request for a specific title of content (or portion of the content) to the communication management resource 140 (such as a so-called streaming back office, application backend, etc.) via communications 621 from the communication device 120 over network 190 to the communication management resource 140. The request received by the communication management resource 140 in communications 621 from the communication device 120 may prompt the communication management resource 140 to determine if the communication device 120 and corresponding user 108 are authorized to receive content from the content delivery network 101. The repository 181 or other suitable entity can be configured to store information indicating which of multiple different URLs is to be used to retrieve the requested content from the content delivery network 101.

Assuming that the communication management resource 140 determines that the communication device 120 and corresponding user 108 are authorized to retrieve content (such as CONT A or content A) requested by the communication device, in response to receiving the request for content originating from the communication device 120 for assignment of a resource (such as an edge node in any of the groups or anycast management node) from which to retrieve or request retrieval of content, the communication management resource 140 selects and communicates a URL and/or network address of an appropriate resource to be used by the communication device 120 to retrieve the requested content. Assume that the anycast management nodes assigned network address XXXA are configured to distribute the requested content A (i.e., CONT A) to the communication device 120. In such an instance, via communications 621, the communication management resource 140 communicates (such as in a CDN streaming URL response) a specific URL (Uniform Resource Locator) such as AC-URL-A (anycast URL) associated with the network address XXXA to the communication device 120.

The communication device 120 then uses the AC-URL-A received from the communication management resource 140 as a basis in which to retrieve the respective content. For example, in operation #3, via communications 622, the communication device 121 forwards the respective anycast URL-A to the communication management resource 141 (such as a domain name server, URL to network address translator, or other suitable entity). The communication management resource 141 translates (or maps or looks up anycast host name associated with) the received request associated with AC-URL-A into an appropriate destination network address such as XXXA to be used by the communication device 120 to retrieve the requested content from the content delivery network 101. Further, via communications 622, the communication management resource 141 forwards the network address XXXA (such as an anycast proxy Internet Protocol or IP address) in a response via communications 622 to the communication device 120.

As further shown, in operation #4, via communications 623, the communication device 120 generates and communicates a respective content request directed to the network address XXXA received from the communication management resource 141. As previously discussed, the content delivery network 101 can be configured to route the content request to network address XXXA in accordance with an anycast routing protocol. For example, the content delivery network 101 routes the content request from the communication device 120 to the cluster 102-4 and corresponding anycast management node 124 because it is nearest to the communication device 120. Thus, in response to receiving the content request from the communication device 120 directed to the target/destination network address XXXA, the content delivery network 101 routes the request for content by the communication device 120 in operation #4 to the cluster and/or resource closest to the communication device 120 in the content delivery network 101. This happens to be the cluster 102-4. In one embodiment, the content delivery network 101 delivers the request for content (such as based on a HTTP Get Request for the content communicated from the communication device 120 to the anycast management node 124) from the communication device 120 in communications 623 to the anycast management node 124. As previously discussed, the request for content can include an identity of the requested content A.

Still further, in operation #4, rather than the anycast management node 124 notifying or redirecting the communication device 120 of a particular edge node in cluster 102-4 from which to retrieve the requested content A, the anycast management node 124 redirects the communication device 120 to the communication management resource 151 to determine an appropriate edge node from which the communication device 120 is to retrieve the requested content. More specifically, via communications 623, the anycast management node 124 generates a redirect response and communicates it to the communication device 120. The communication device 120 receives the redirect response from the anycast management node 124. In accordance with the redirect response from the anycast management node 124, the communication device 120 communicates a further redirect message to the communication management resource 141 in operation #5 of FIG. 7 to resolve the FQDN (fully qualified domain name) redirect response received from the anycast management node 124 in operation #4.

Figure 7:
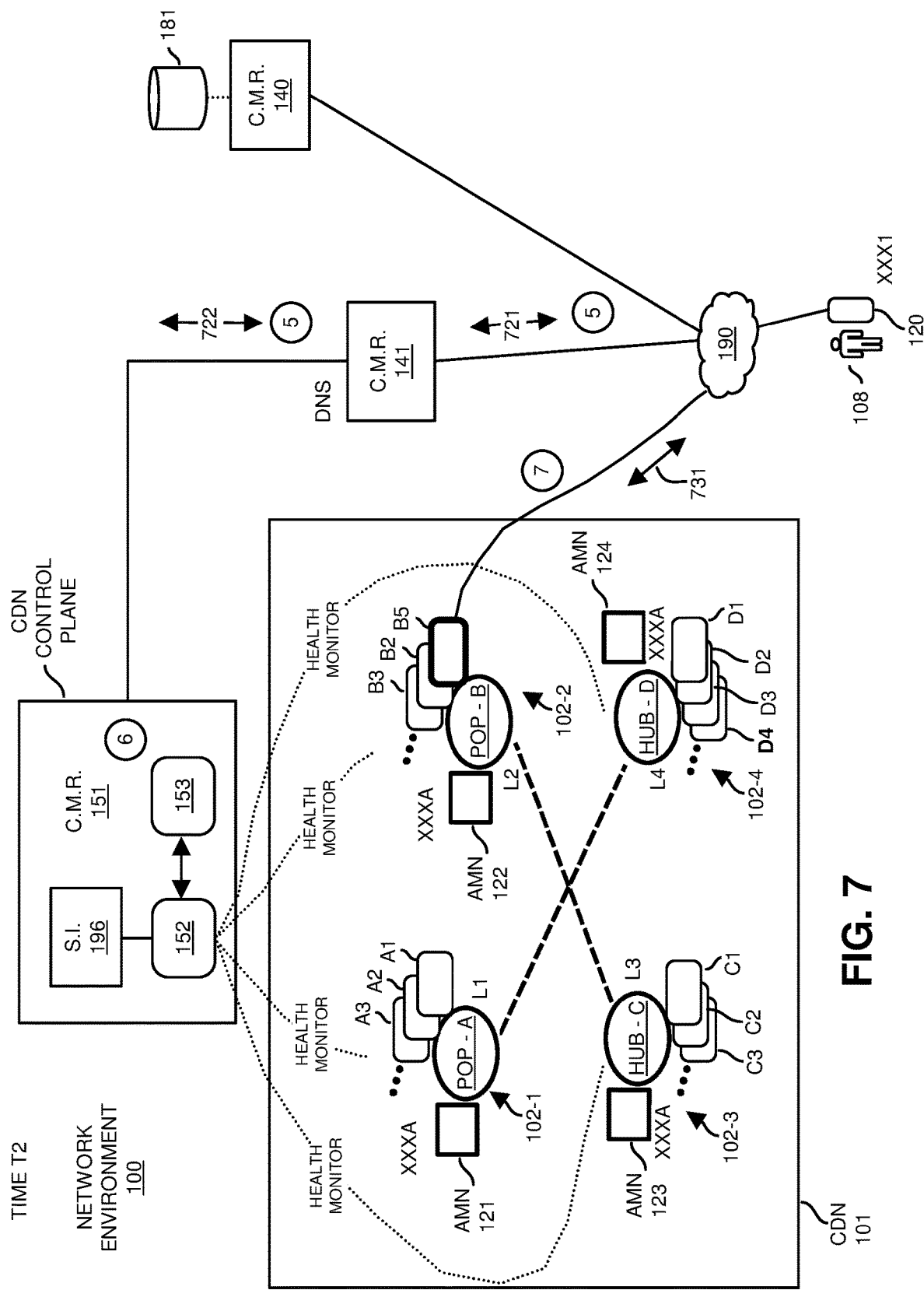
FIG. 7 is an example diagram illustrating operations associated with redirecting a client device to an appropriate edge network node to retrieve content as discussed herein.

Further operations are discussed in FIG. 7 and corresponding text.

FIG. 7 is an example diagram illustrating operations associated with redirecting a client device to an appropriate cluster and corresponding edge network node in the selected cluster to retrieve content as discussed herein.

More specifically, in operation #5, via communications 721, in response to receiving the redirect response from the anycast management node 124, the communication device 120 communicates a redirect message to the communication management resource 141. The redirect message in communications 721 to the communication management resource 141 can be configured to include any suitable information such as a unique identifier value indicating the unique identity of the anycast management node 124, identity of requested content, location L4 of the cluster 102-4 and/or anycast management node 124, etc., other suitable information.

The communication management resource 141 (such as management hardware) facilitates or manages distribution of content in the network environment 100 from multiple resources associated with the multiple anycast nodes. For example, in response to receiving the redirect message from the communication device 120 in communications 721, further in operation #5, the communication management resource 141 communicates a message associated with the received redirect message to the communication management resource 153.

In processing operation #6, the communication management resource 151 determines a best cluster and corresponding edge node from which the communication device 120 is to retrieve the requested content. Thus, instead of the anycast management node 124 deciding which edge node is to be used to deliver the content to the communication device 120, the communication management resource 151 and/or communication management resource 153 determines the best edge node from which to assign to the communication device 120 based on analysis of the status information 196-2 (FIG. 5).

More specifically, as previously discussed, the communication management resource 151 tracks the content distribution status (such as ability for each of the content distribution network nodes to distribute content) in the network environment. The communication management resource 152 produces, for each of the clusters, a ranking of the different edge nodes and their ability to distribute content to the communication device 120 or other communication devices in the network environment 100.

As further discussed herein, the communication management hardware uses the ranking as a basis to select the identity of the network node from the first group.

More specifically, assume that the communication management resource 153 determines from communications 722 that the communication device 120 is nearest to the cluster 102-4. This determination can be achieved in any suitable manner. For example, the communications from the communication device 120 may indicate the identity of the anycast management node 124. The communication management resource 151 and communication management resource 153 knows the location of the anycast management node 124 and corresponding edge nodes D1, D2, D3, etc., associated with the cluster 102-4 and anycast management node 124 at location L4. In other words, the communication management resource can be configured to map the identity of the anycast management node 124 to the location L4 and/or corresponding cluster 102-4. The edge nodes in cluster 102-4 therefore may be the best candidate edge nodes from which to select an edge to support distribution of the requested content to the communication device 120 assuming they are not congested.

The communication management resource 153 and/or 151 can be configured to consider which of the multiple content distribution network nodes (edge nodes) in the cluster 102-4 is best suited to deliver the requested content to the communication device 120. The status information 196-2 in FIG. 5 indicates that ranked edge node D4 is a best candidate amongst multiple candidate edge nodes in which to select for use by the communication device 120 to retrieve the requested content. However, the best edge node D4 in cluster 102-4 is quite heavily burdened delivering content to other communication devices in the network environment as indicated by the assignment of health status value 8 to it. Thus, edge node D4 and other edge nodes in the cluster 102-4 are not good candidates to assign to the communication device 120 because the mobile communication device 120 may experience delays if any of the edge nodes D1, D2, D3, etc., was assigned to distribute requested content to the mobile communication device 120.

Assume in this example that the communication management resource 153 detects that the communication device 120 is reasonably close to cluster 102-2 because it is close to location L4 and is a good candidate to deliver content to the communication device 120. In such an instance, the communication management resource 153 considers whether an edge node in the cluster 102-2 is a good candidate to support the communication device 120. As mentioned, assume that the cluster 102-2 is sufficiently close to serve the requested content to the communication device 120.

In a similar manner as previously discussed, via status information 196-2 (FIG. 5), the communication management resource 153 and/or 151 determines which of the multiple content distribution network nodes (edge nodes) in the cluster 102-2 is best suited to deliver the requested content to the communication device 120. The status information 196-2 in FIG. 5 indicates that ranked edge node B5 is a best candidate amongst multiple candidate edge nodes in which to select for use by the communication device 120 to retrieve the requested content. The communication management resource 151 therefore selects the edge node B5 for use by the communication device 120 because it is the best edge node and potentially only good candidate edge node available in that cluster 102-2 to serve the communication device 120. In such an instance, via communications 722 in FIG. 7, the communication management resource 153 communicates the identity of the selected edge node B5 to the communication management resource 141. Further, via communications 721, the communication management resource 141 forwards the identity (such as unicast network address) of the selected edge node B5 to the communication device 120. The communication device 120 uses the unicast network address of the edge node B5 to forward the request for content for retrieval of same.

As further shown, in processing operation #7, and via corresponding communications 731, the communication device 120 communicates a respective request for the content directly to the unicast of the selected edge node B5. The request includes an identity of the requested content A. The edge node B5 retrieves the requested content A from one or more repositories in the content delivery network 101 and communicates the requested content via communications 731 to the communication device 120. Note that the communications 731 may support multiple requests communicated from the communication device 120 to the edge node B5 for a duration of time such as 10 seconds or other suitable amount of time. The edge node B5 responds with appropriate requested one or more segments of content A communicated to the communication device 120.

Thus, the operations as described herein support load-balancing amongst the different edge nodes within different clusters. In other words, the above example, the communication management resource 153 has a global overview of the abilities of each of the clusters and corresponding edge nodes to handle new content request tasks. The selection of the edge node B5 of cluster 102-2 (because it is free) in the above example helps to equalize distribution of content from the different clusters as well as the edge nodes in the cluster 102-4. More specifically, the edge node B5 at or around location L2 has extra bandwidth capability (i.e., it is not congested) to communicate requested content to one or more communication devices as it ranked highest on the list such as because it is least used amongst the edge nodes in cluster 102-2. Assignment of the edge node B5 to service the content requests from the communication device 120 helps to balance the load of handling content distribution requests from multiple communication devices in communication with cluster 102-2. Selection of the edge node B5 in cluster 102-2 provides load-balancing amongst clusters because it reduces demand on cluster 102-4. In other words, if the communication management resource 151 or anycast management node 124 selected an edge node from the cluster 102-4, the cluster 102-4 would be become too heavily loaded.

Accordingly, if none of the content distribution network nodes (edge nodes) in a cluster are sufficiently good candidates in which to distribute requested content, the communication management hardware (communication management resource 151, communication management resource 153, etc.) as discussed herein can be configured to select an edge node from another cluster (further away from the cluster 102-4) to support conveyance of requested content A. This provides load balancing of distributing content from the different clusters.

Figure 8:
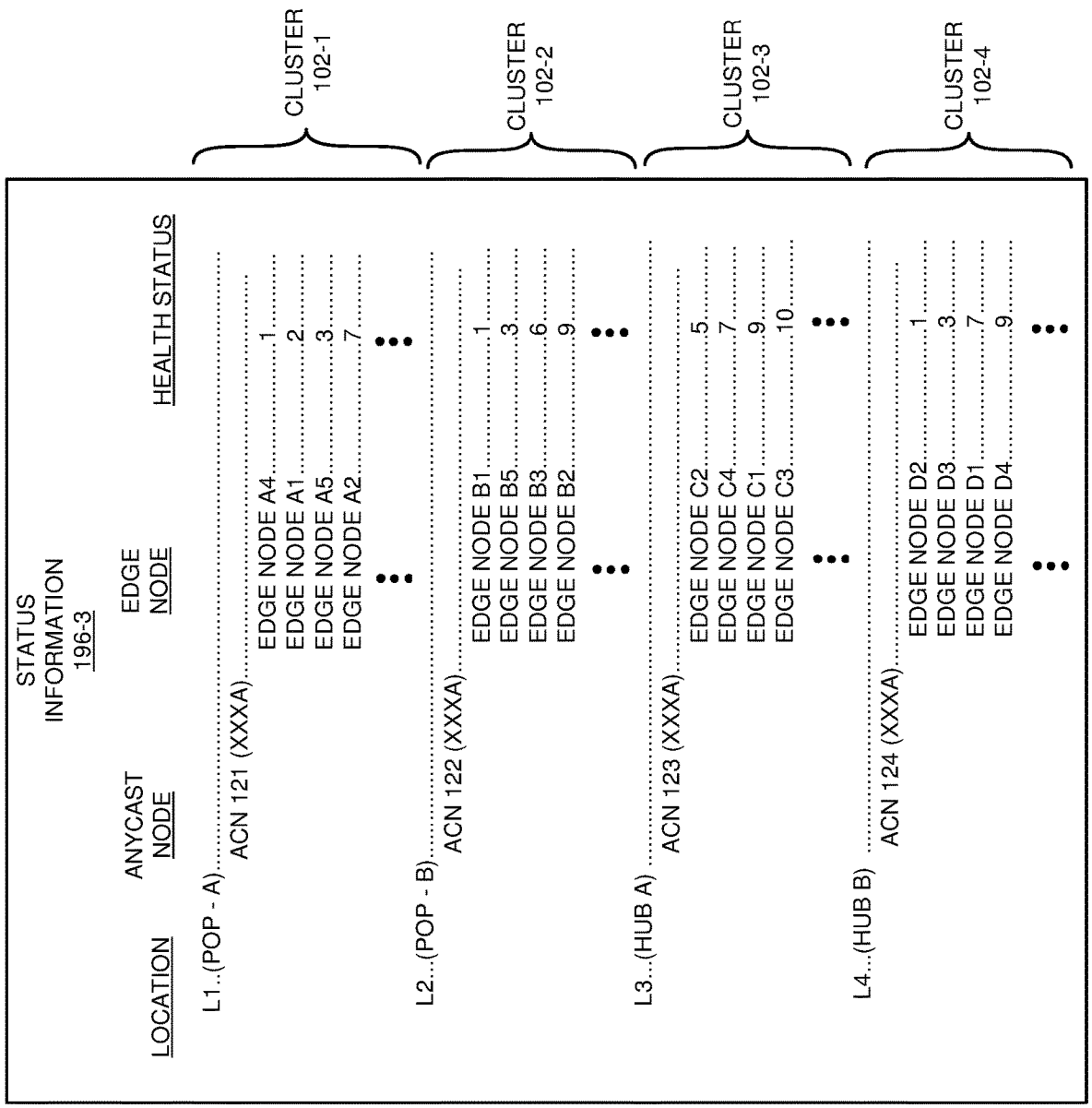
FIG. 8 is an example diagram illustrating status information (such as health) associated with content distribution network nodes as discussed herein.

FIG. 8 is an example diagram illustrating status information (such as health) associated with content distribution network nodes as discussed herein.

For video streaming applications that rely on a backend for authorization, authentication, accounting, license acquisition, and content selection, additional systems can be leveraged to let the backend become better aware of the exact client location in the network. This solution uses both Anycast and DNS for client communication, but also incorporates a method for the Anycast LLB to make the backend aware of client IP addresses it is serving as well as its own location. The backend would then know all of the Anycast LLB locations (such as anycast management nodes, etc.) in the network, and all clients served in that location and would then have information for all client IPs and their locations.

Once the backend (a.k.a., communication management resource 140) is aware of a client's location, it can then hand out a unicast URL for content that points the client to the closest CDN edge site. Once the backend (communication management resource 140) is aware of a client location, the client no longer needs to use the Anycast LLB (anycast management node) and can route the client to the closest site more efficiently. If periodic updates are needed, the backend can age out the cache for client IP to location mappings, and force a periodic check to the Anycast LLB to re-learn clients again.

The communication management resource 140 (backend system) can be configured to implement Geographical IP location services (such as MaxMind™) or any other method for determining client location, so the method used doesn't have to be restricted to just using unicast addresses of the anycast management nodes (Anycast LLBs). The idea of using location information associated with the mobile communication device (such as location of a nearest cluster to the mobile communication device 120 or the location of the mobile communication device itself) builds on the idea in FIGS. 1-7, but improves upon that idea by using a system external to the CDN 101 to learn the location of each client, and give the respective client a CDN URL that will get them to the closest CDN edge cache. This will reduce the load on the Anycast LLBs, and get clients connected to the best CDN Edge node more efficiently. For example, the communication management resource 140 as discussed herein can be configured to determine or receive location information indicating a location of the mobile communication device 120 from any suitable entity.

As previously discussed, the communication management resource 152 generates the status information 196 to track the health of the different network resources in the content distribution network 101 and their ability to handle new content delivery tasks of delivering requested content to each of one or more communication devices. Note again that the communication management resource 152 constantly updates the status information 196 over time because the delivery of content and corresponding ability to handle new content delivery tasks by the edge nodes changes over time.

Status information 196-3 illustrates the collective status associated with the different edge nodes at or around time T3.

In a manner as previously discussed, assume that the communication management resource 152 determines from monitoring that the edge node A4 has a very high ability to handle a new content delivery task of communicating content to a respective communication device in the network 100. In such an instance, the communication management resource 152 assigns the performance status value (health status) of 1 to the edge node A2.

Assume further that the communication management resource 152 determines from monitoring that the edge node A1 has a fairly high ability to deliver content to a respective communication device. In such an instance, based on the determined ability to handle a new content delivery task, the communication management resource 152 assigns the performance status value (health status) of 2 to the edge node A1.

Assume further that the communication management resource 152 determines from monitoring that the edge node A5 has a good ability to deliver content to a respective communication device. In such an instance, based on the determined ability to handle a new content delivery task, the communication management resource 152 assigns the performance status value (health status) of 3 to the edge node A5.

As previously discussed, the assignment of health status to each of the edge nodes results in a ranking of the edge nodes and their ability to deliver content to new communication devices requesting content from the content delivery network 101. For example, at or around time T3, the status information 196-3 indicates the ranking of edge nodes at cluster 102-1 as follows: edge node A4 is the best candidate to support a new task/request for delivering content; edge node A1 is a next best candidate to support a new request for delivering content; edge node A5 is the next best candidate to support a new request for delivering content; edge node A2 is a next best candidate to support a new request for delivering content; and so on.

In general, as previously discussed, the ranking of the edge nodes at different ranking levels indicates an imbalance of the edge nodes delivering content in the network environment. As further discussed herein, selection of the best candidates to handle new content delivery requests helps to balance delivery of content from each of the edge nodes to be more uniform.

Yet further, in a manner as previously discussed, assume that the communication management resource 152 determines from monitoring that the edge node B1 has a very high ability to handle a new content delivery task of communicating content to a respective communication device. In such an instance, the communication management resource 152 assigns the performance status value (health status) of 1 to the edge node B1.

Assume further that the communication management resource 152 determines from monitoring that the edge node B5 has a very high ability to deliver content to a respective communication device. In such an instance, based on the determined ability to handle a new content delivery task, the communication management resource 152 assigns the performance status value (health status) of 3 to the edge node B5.

Assume further that the communication management resource 152 determines from monitoring that the edge node B3 has a moderate ability to deliver content to a respective communication device. In such an instance, based on the determined ability to handle a new content delivery task, the communication management resource 152 assigns the performance status value (health status) of 6 to the edge node B3.

In this manner, the communication management resource 152 rates each of the edge nodes.

The assignment of health status to each of the edge nodes results in a ranking of the edge nodes and their ability to deliver content to new communication devices requesting content from the content delivery network 101. For example, the status information 196-3 at time T3 indicates the ranking of edge nodes at cluster 102-2 as follows: edge node B1 is the best candidate to support a new request for delivering content for cluster 102-2; edge node B5 is a next best candidate to support a new request for delivering content; edge node B3 is the next best candidate to support a new request for delivering content; edge node B2 is a next best candidate to support a new request for delivering content; and so on.

At or around time T3, assume that the communication management resource 152 determines from monitoring that the edge node C3 has a good ability to handle a new content delivery task of communicating content to a respective communication device. In such an instance, the communication management resource 152 assigns the performance status value (health status) of 5 to the edge node C2.

Assume further that the communication management resource 152 determines from monitoring that the edge node C4 has a less than moderate ability to deliver content to a respective communication device. In such an instance, based on the determined ability to handle a new content delivery task, the communication management resource 152 assigns the performance status value (health status) of 7 to the edge node C4.

Assume further that the communication management resource 152 determines from monitoring that the edge node C1 has a poor ability to deliver content to a respective communication device because edge node C1 is currently overloaded. In such an instance, based on the determined ability to handle a new content delivery task, the communication management resource 152 assigns the performance status value (health status) of 9 to the edge node C1.

Assume further that the communication management resource 152 determines from monitoring that the edge node C3 has a poor ability to deliver content to a respective communication device because edge node C3 is currently overloaded. In such an instance, based on the determined ability to handle a new content delivery task, the communication management resource 152 assigns the performance status value (health status) of 10 to the edge node C3. In this manner, the communication management resource 152 rates each of the edge nodes.

The assignment of health status to each of the edge nodes results in a ranking of the edge nodes and their ability to deliver content to new communication devices requesting content from the content delivery network 101. For example, the status information 196-3 indicates the ranking of edge nodes at cluster 102-3 as follows: edge node C2 is the best candidate in cluster 102-3 to support a new request for delivering content; edge node C4 is a next best candidate to support a new request for delivering content; edge node C1 is the next best candidate to support a new request for delivering content; edge node C3 is a next best candidate to support a new request for delivering content; and so on.

At or around time T3, assume that the communication management resource 152 determines from monitoring that the edge node D2 has very high free bandwidth and is a good candidate to handle a new content delivery task of communicating content to a respective communication device. In such an instance, the communication management resource 152 assigns the performance status value (health status) of 1 to the edge node D2.

Assume further that the communication management resource 152 determines from monitoring that the edge node D3 has a fairly good ability to deliver content to a respective communication device. In such an instance, based on the determined ability to handle a new content delivery task, the communication management resource 152 assigns the performance status value (health status) of 3 to the edge node D3.

Assume further that the communication management resource 152 determines from monitoring that the edge node D1 has a poor ability to deliver content to a respective communication device. In such an instance, based on the determined ability to handle a new content delivery task, the communication management resource 152 assigns the performance status value (health status) of 7 to the edge node D1.

Assume further that the communication management resource 152 determines from monitoring that the edge node D4 has a very poor (or no) ability to deliver content to a respective communication device. In such an instance, based on the determined ability to handle a new content delivery task, the communication management resource 152 assigns the performance status value (health status) of 9 to the edge node D4. In this manner, the communication management resource 152 rates each of the edge nodes.

The assignment of health status to each of the edge nodes results in a ranking of the edge nodes and their ability to deliver content to new communication devices requesting content from the content delivery network 101. For example, the status information 196-3 for time T3 indicates the ranking of edge nodes at cluster 102-4 as follows: edge node D2 is the best candidate in cluster 102-4 to support a new request for delivering content; edge node D3 is a next best candidate to support a new request for delivering content; edge node D1 is the next best candidate to support a new request for delivering content; edge node D4 is a next best candidate to support a new request for delivering content; and so on.

Figure 9:
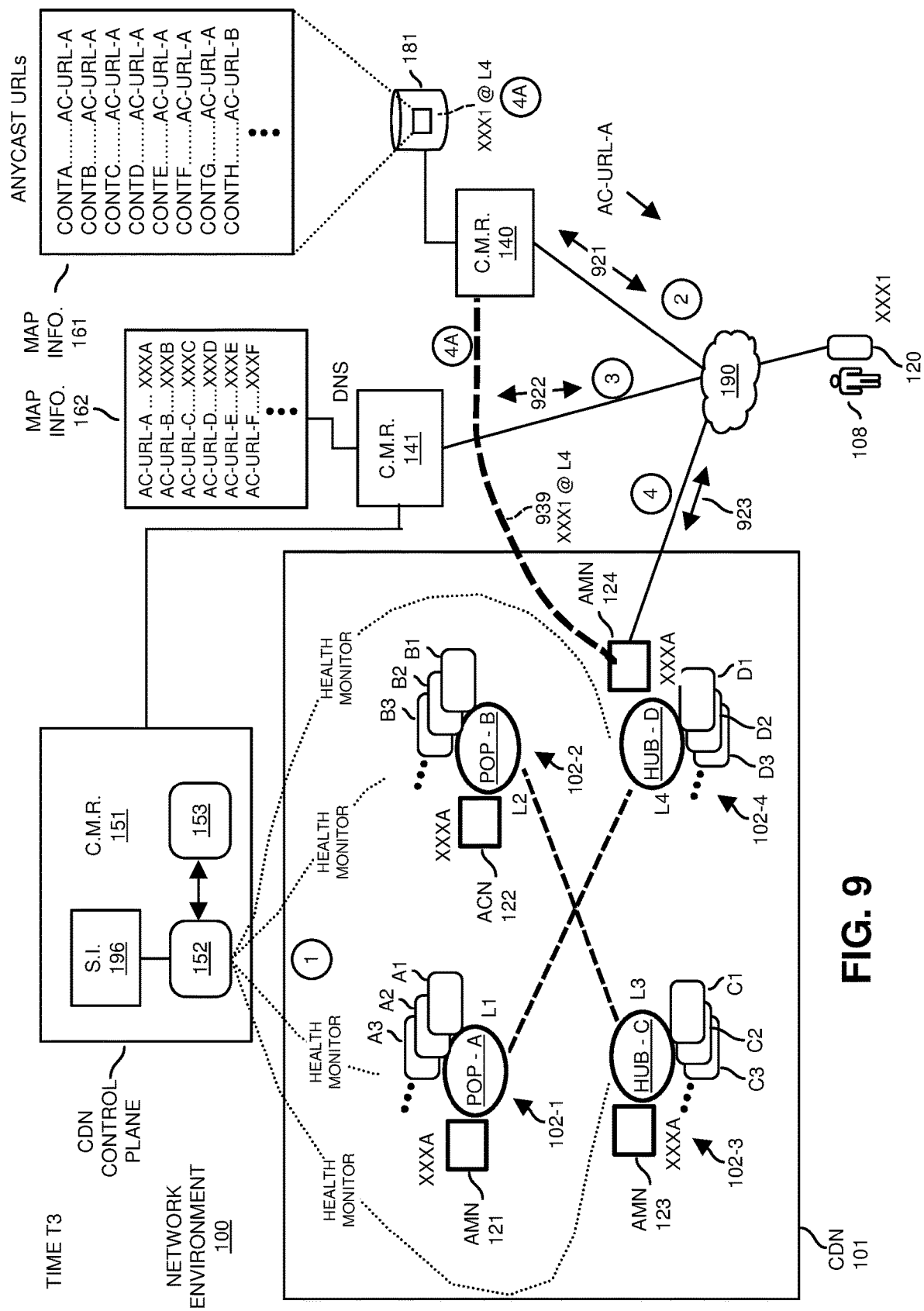
FIG. 9 is an example diagram illustrating operations associated with redirecting a client device to an appropriate edge network node to retrieve content and storing a location associated with communication device as discussed herein.

FIG. 9 is an example diagram illustrating operations associated with redirecting a client device to an appropriate edge network node to retrieve content and storage of location information associated with a communication device as discussed herein.

As previously discussed, via operation #1, the communication management resource 152 tracks a status of multiple different groupings (clusters) of edge nodes, each of which is operative to distribute content (such as video content, segments of video content, digital assets, etc.) in a network environment 100.

For example, via status information 196-3 (FIG. 8), the communication management resource 152 tracks a first content distribution status of a first cluster 102-1 (group) of network nodes (such as first content distribution edge nodes A1, A2, A3, etc.) assigned and thus managed by a first anycast management node 121; the communication management resource 152 tracks a second content distribution status of a second group (cluster 102-2) of network nodes (such as second content distribution edge nodes B1, B2, B3, etc.) assigned and thus managed by a second anycast management node 122; and so on.

As further shown, the user 108 operates the communication device 120. Assume in this example, in operation #2, at or around time T3, based on input from the user 108, the communication device 120 communicates a respective request for a specific title of content to the communication management resource 140 (such as a so-called streaming back office, application backend, etc.) via communications 921 from the communication device 120 over network 190 to the communication management resource 140. The request received by the communication management resource 140 from the communication device 120 may prompt the communication management resource 140 to determine if the communication device 120 and corresponding user 108 are authorized to receive content from the content delivery network 101. The repository 181 stores information (such as map information 161) indicating which of multiple different anycast URLs is to be used to retrieve the requested content from the content delivery network 101 in a manner as previously discussed.

Assuming that the communication management resource 140 determines that the communication device 120 and corresponding user 108 are authorized to retrieve content requested by the communication device from content delivery network 101 and the location of the communication device 120 is not yet known, in response to receiving the request for content originating from the communication device 120 for assignment of a resource (such as an edge node in any of the groups or anycast management node) from which to retrieve or request retrieval of content, the communication management resource 140 selects and communicates an appropriate anycast URL and/or network address of an appropriate resource to be used by the communication device 120 to retrieve the requested content. Assume that the anycast management nodes assigned anycast network address XXXA are configured to distribute the requested content to the communication device 120. In such an instance, via communications 921, the communication management resource 140 communicates (such as in a CDN streaming URL response) a specific anycast URL (Uniform Resource Locator) such as AC-URL-A (anycast URL) associated with the anycast network address XXXA to the communication device 120.

The communication device 120 then uses the anycast URL such as AC-URL-A received from the communication management resource 140 as a basis in which to retrieve the respective content. For example, the communication device 120 needs to convert anycast AC-URL-A into a network address. In operation #3, via communications 922, the communication device 120 forwards the respective anycast AC-URL-A to the communication management resource 141 (such as a domain name server, URL to network address translator, or other suitable entity) for translation into a network address. The communication management resource 141 converts the anycast AC-URL-A to the corresponding anycast network address XXXA. More specifically, via map information 162, the communication management resource 141 translates (or maps) the received request associated with anycast AC-URL-A into an appropriate destination network address such as anycast network address XXXA to be used by the communication device 120 to retrieve the requested content from the content delivery network 101.

Further, via communications 922, the communication management resource 141 forwards the network address XXXA (such as an anycast proxy Internet Protocol or IP address) in a response via communications 922 to the communication device 120.

As further shown, in operation #4, via communications 923, the communication device 120 generates and communicates a respective content request directed from the communication device 120 to the network address XXXA received from the communication management resource 141. The request can be configured to include the anycast network address XXXA as well as a value indicating an identity of the requested content.

As previously discussed, the content delivery network 101 can be configured to route the content request to network address XXXA in accordance with an anycast routing protocol. For example, the content delivery network 101 routes the content request from the communication device 120 in communication 923 to the cluster 102-4 and corresponding anycast management node 124 because it is nearest to the communication device 120. Thus, in response to receiving the content request from the communication device 120 directed to the target/destination network address XXXA, the content delivery network 101 routes the request for content by the communication device 120 to the nearest cluster and/or resource in the content delivery network 101. This happens to be the cluster 102-4.

In one embodiment, the content delivery network 101 delivers the request for content (such as based on a HTTP Get Request for the content communicated from the communication device 120 to the anycast management node 124) from the communication device 120 in communications 923 to the anycast management node 124.

In this example embodiment, in additional operation #4A, in response to detecting that the mobile communication device 120 resides near location L4, the anycast management node 124 or other suitable entity provides notification (feedback) that the mobile communication device 120 resides near L4 via communications 939 (such as feedback) communicated to the communication management resource 140. L4 may represent the actual location of the communication device 120. The location information L4 associated with the mobile communication device 120 will be used at a later time to support redirection of the mobile communication device 120 to an appropriate edge node or cluster in the network environment 100.

In one embodiment, the communication management resource 140 stores network address XXX1 assigned to the communication device 120 and corresponding location information L4 associated with the communication device 120 in the repository 181. Thus, the communication management resource 140 knows for future requests from the communication device 120 where it approximately or specifically resides (such as location L4).

Note that the communication device 120 may move in the network environment 100. The communication management resource 140 can be configured to assign an expiration time (or time to live value) to the information mapping the network address XXX1 associated with communication device 120 to the location L4.

Still further, in operation #4, rather than the anycast management node 124 notifying the communication device 120 of a particular edge node in cluster 102-4 from which to retrieve the requested content, the anycast management node 124 redirects the communication device 120 to the communication management resource 151 (global management resource), which determines an appropriate edge node from which the communication device 120 is to retrieve the requested content A. In a similar manner, the communication management resource 151 determines an appropriate edge node from which to retrieve content in the content delivery network for each of multiple communication devices requesting retrieval of content from the content delivery network/In other words, rather than each anycast management node in content delivery network 101 deciding which edge node in its cluster to deliver content to the requesting communication device, each respective anycast management node forwards a received request to communication management resource 151 (global management resource for multiple clusters) for global determination of which edge node in any respective cluster is best suited to deliver content to the request requesting communication device.

More specifically, in this example, via communications 923, the anycast management node 124 generates a redirect response and communicates it to the communication device 120. The communication device 120 receives the redirect response from the anycast management node 124. In accordance with the redirect response from the anycast management node 124, the communication device 120 communicates a further redirect message to the communication management resource 141 in operation #5 of FIG. 10 to resolve the FQDN (fully qualified domain name) redirect response received from the anycast management node 124 in operation #4.

Figure 10:
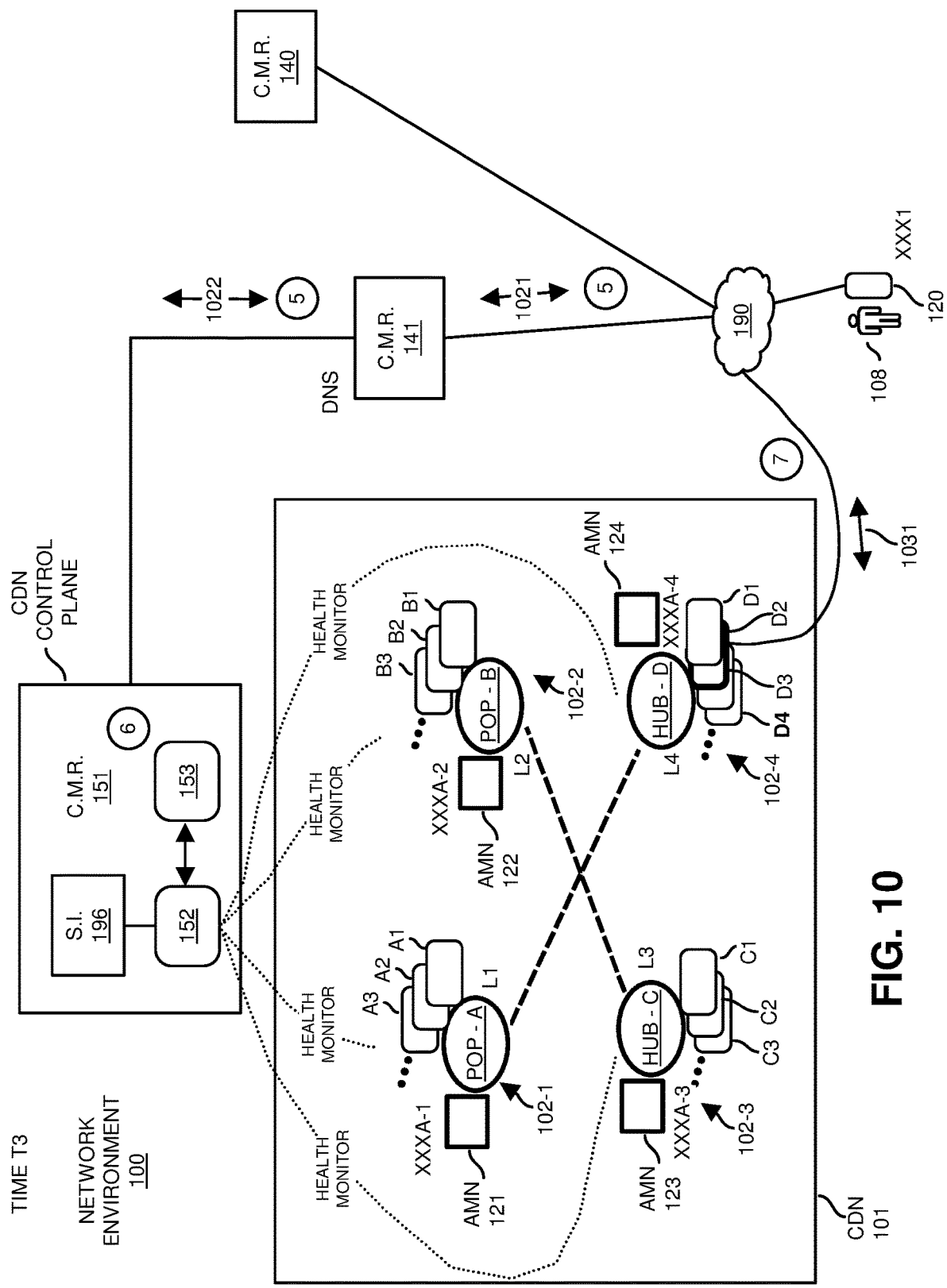
FIG. 10 is an example diagram illustrating operations associated with redirecting a client device to an appropriate edge network node to retrieve content as discussed herein.

Further operations are discussed in FIG. 10 and corresponding text.

FIG. 10 is an example diagram illustrating operations associated with redirecting a client device to an appropriate edge network node to retrieve content as discussed herein.

More specifically, in operation #5, via communications 1021, in response to receiving the redirect response from the anycast management node 124, the communication device 120 communicates a redirect message to the communication management resource 141. The redirect message in communications 1021 to the communication management resource 141 can be configured to include any suitable information such as a unique identifier value indicating the unique identity of the anycast management node 124, identity of requested content, location L4 of the cluster 102-4 and/or anycast management node 124, etc., other suitable information.

The communication management resource 141 (such as management hardware) facilitates or manages distribution of content in the network environment 100 from multiple resources associated with the multiple anycast nodes. For example, in response to receiving the redirect message from the communication device 120 in communications 1021, further in operation #5, the communication management resource 141 communicates a message associated with the redirect message to the communication management resource 153 via communications 1022.

In processing operation #6, the communication management resource 151 determines a best edge node from which the communication device 120 is to retrieve the requested content based on status information 196-4. Thus, instead of the anycast management node 124 deciding which edge node is to be used to deliver the content to the communication device 120, the communication management resource 151 and/or communication management resource 153 determines the best edge node amongst multiple clusters of edge nodes from which to assign to the communication device 120 based on analysis of the status information 196-4 for time T3.

More specifically, as previously discussed, the communication management resource 151 tracks the content distribution status (such as ability for each of the content distribution network nodes to distribute content) in the network environment. The communication management resource 152 produces, for each of the clusters, a ranking of the different edge nodes and their ability (such as from best to worst) to distribute content to the communication device 120 or other communication devices in the network environment 100.

As further discussed herein, the communication management hardware uses the ranking as a basis to select the identity of the network node from the first group.

More specifically, as previously discussed, assume that the communication management resource 153 determines from communications 1022 that the communication device 120 is nearest to the cluster 102-4 or location L4. This determination can be achieved in any suitable manner. For example, the communications from the communication device 120 may indicate the identity of the anycast management node 124. The communication management resource 151 and communication management resource 153 knows the location of the anycast management node 124 and corresponding edge nodes D1, D2, D3, etc., associated with the cluster 102-4 and anycast management node 124 at location L4. If free, the edge nodes D1, D2, D3, etc., are good candidates to serve content to the communication device. In other words, the communication management resources as discussed herein can be configured to map the identity of the anycast management node 124 to the location L4 and/or corresponding cluster 102-4. The edge nodes in cluster 102-4 therefore may be the best candidate edge nodes from which to select an edge to support distribution of the requested content to the communication device 120.

In a similar manner as previously discussed, the communication management resource 153 and/or 151 can be configured to consider which of the multiple content distribution network nodes (edge nodes) in the cluster 102-4 is best suited to deliver the requested content to the communication device 120. The status information 196-3 for time T3 in FIG. 8 indicates that ranked edge node D2 is currently a best candidate amongst multiple candidate edge nodes in which to select for use by the communication device 120 to retrieve the newly requested content. In such an instance, assume that the communication management resource 150 selects the edge node D2 for use by the communication device 120 because it is the best edge node and potentially only good candidate edge node available in that cluster 102-4. In such an instance, via communications 1022, the communication management resource 153 communicates the identity (such as unicast network address XXD2) of the selected edge node D2 to the communication management resource 141. Further, via communications 1021, the communication management resource 141 forwards the identity (such as unicast network address XXD2) of the selected edge node D2 to the communication device 120.

As further shown, in processing operation #7, and via corresponding communications 1031, the communication device 120 communicates a respective request for the content to the selected edge node D2 via the unicast network address XXD2 assigned to the edge node D2. The edge node D2 retrieves the requested content from one or more repositories in the content delivery network 101 and communicates the requested content A to the communication device 120. Note that the communications may support multiple requests for segments of content A communicated from the communication device 120 to the edge node D2 for a duration of time such as 10 seconds or other suitable amount of time. The edge node D2 responds with appropriate requested one or more segments of content A communicated to the communication device 120.

It should be noted that the operations as described herein support load-balancing amongst the different edge nodes within a respective cluster as well as load-balancing amongst edge nodes and all of the clusters. In other words, in the above example, the communication management resource 153 has a global overview of the abilities of each of the clusters and corresponding edge nodes to handle content request tasks. The selection of the edge node D2 in the above example helps to equalize distribution of content from each of the edge nodes in the cluster 102-4 and other cluster in the content delivery network 101. More specifically, the edge node D2 at location is extra bandwidth capability to communicate requested content to one or more communication devices as it ranked highest on list (such as because it is least used amongst the edge nodes in cluster 102-4. Assignment of the edge node D2 to service the content requests from the communication device 120 helps to balance the load of handling content distribution requests from multiple communication devices in communication with cluster 102-4.

Figure 11:
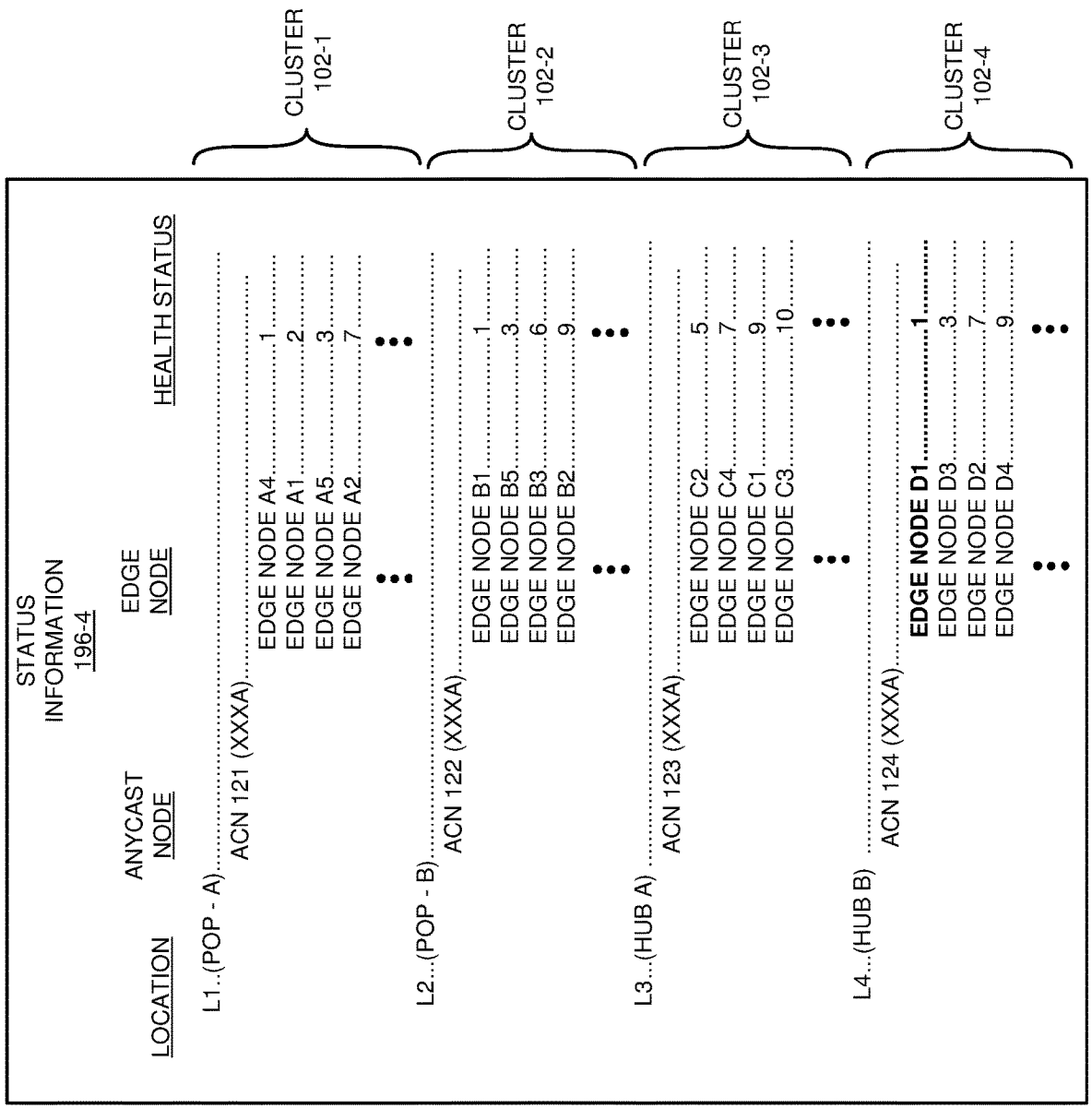
FIG. 11 is an example diagram illustrating status information (such as health status information) associated with content distribution network nodes as discussed herein.

FIG. 11 is an example diagram illustrating status information (such as health) associated with content distribution network nodes as discussed herein.

As previously discussed, the communication management resource 152 generates the status information 196-4 to track the health of the different network resources in the content distribution network 101 and their ability to handle new content delivery tasks of delivering requested content to each of one or more communication devices. Note again that the communication management resource 152 constantly updates the status information 196 over time because the delivery of content and corresponding ability to handle new content delivery tasks by the edge nodes changes over time. Status information 196-4 illustrates the collective status associated with the different edge nodes at or around time T4.

In a manner as previously discussed, assume that the communication management resource 152 determines from monitoring that the edge node A4 has a very high ability to handle a new content delivery task of communicating content to a respective communication device in the network 100. In such an instance, the communication management resource 152 assigns the performance status value (health status) of 1 to the edge node A2.

Assume further that the communication management resource 152 determines from monitoring that the edge node A1 has a fairly high ability to deliver content to a respective communication device. In such an instance, based on the determined ability to handle a new content delivery task, the communication management resource 152 assigns the performance status value (health status) of 2 to the edge node A1.

Assume further that the communication management resource 152 determines from monitoring that the edge node A5 has a good ability to deliver content to a respective communication device. In such an instance, based on the determined ability to handle a new content delivery task, the communication management resource 152 assigns the performance status value (health status) of 3 to the edge node A5.

As previously discussed, the assignment of health status to each of the edge nodes results in a ranking of the edge nodes and their ability to deliver content to new communication devices requesting content from the content delivery network 101. For example, at or around time T4, the status information 196-4 indicates the ranking of edge nodes at cluster 102-1 as follows: edge node A4 is the best candidate to support a new task/request for delivering content; edge node A1 is a next best candidate to support a new request for delivering content; edge node A5 is the next best candidate to support a new request for delivering content; edge node A2 is a next best candidate to support a new request for delivering content; and so on. In general, the ranking of the edge nodes at different ranking levels indicates an imbalance of the edge nodes delivering content in the network environment. As further discussed herein, selection of the best candidates to handle new content delivery requests helps to balance delivery of content from each of the edge nodes to be more uniform.

In a manner as previously discussed, assume that the communication management resource 152 determines from monitoring that the edge node B1 has a very high ability to handle a new content delivery task of communicating content to a respective communication device. In such an instance, the communication management resource 152 assigns the performance status value (health status) of 1 to the edge node B1.

Assume further that the communication management resource 152 determines from monitoring that the edge node B5 has a very high ability to deliver content to a respective communication device. In such an instance, based on the determined ability to handle a new content delivery task, the communication management resource 152 assigns the performance status value (health status) of 3 to the edge node B5.

Assume further that the communication management resource 152 determines from monitoring that the edge node B3 has a moderate ability to deliver content to a respective communication device. In such an instance, based on the determined ability to handle a new content delivery task, the communication management resource 152 assigns the performance status value (health status) of 6 to the edge node B3.

In this manner, the communication management resource 152 rates each of the edge nodes.

The assignment of health status to each of the edge nodes results in a ranking of the edge nodes and their ability to deliver content to new communication devices requesting content from the content delivery network 101. For example, the status information 196-4 at time T4 indicates the ranking of edge nodes at cluster 102-2 as follows: edge node B1 is the best candidate to support a new request for delivering content for cluster 102-2; edge node B5 is a next best candidate to support a new request for delivering content; edge node B3 is the next best candidate to support a new request for delivering content; edge node B2 is a next best candidate to support a new request for delivering content; and so on.

At or around time T4, assume that the communication management resource 152 determines from monitoring that the edge node C3 has a good ability to handle a new content delivery task of communicating content to a respective communication device. In such an instance, the communication management resource 152 assigns the performance status value (health status) of 5 to the edge node C2.

Assume further that the communication management resource 152 determines from monitoring that the edge node C4 has a less than moderate ability to deliver content to a respective communication device. In such an instance, based on the determined ability to handle a new content delivery task, the communication management resource 152 assigns the performance status value (health status) of 7 to the edge node C4.

Assume further that the communication management resource 152 determines from monitoring that the edge node C1 has a poor ability to deliver content to a respective communication device because edge node C1 is currently overloaded. In such an instance, based on the determined ability to handle a new content delivery task, the communication management resource 152 assigns the performance status value (health status) of 9 to the edge node C1.

Assume further that the communication management resource 152 determines from monitoring that the edge node C3 has a poor ability to deliver content to a respective communication device because edge node C3 is currently overloaded. In such an instance, based on the determined ability to handle a new content delivery task, the communication management resource 152 assigns the performance status value (health status) of 10 to the edge node C3. In this manner, the communication management resource 152 rates each of the edge nodes.

The assignment of health status to each of the edge nodes results in a ranking of the edge nodes and their ability to deliver content to new communication devices requesting content from the content delivery network 101. For example, the status information 196-4 indicates the ranking of edge nodes at cluster 102-3 as follows: edge node C2 is the best candidate in cluster 102-3 to support a new request for delivering content; edge node C4 is a next best candidate to support a new request for delivering content; edge node C1 is the next best candidate to support a new request for delivering content; edge node C3 is a next best candidate to support a new request for delivering content; and so on.

At or around time T4, assume that the communication management resource 152 determines from monitoring that the edge node D1 has very high free bandwidth and is a good candidate to handle a new content delivery task of communicating content to a respective communication device. In such an instance, the communication management resource 152 assigns the performance status value (health status) of 1 to the edge node D1.

Assume further that the communication management resource 152 determines from monitoring that the edge node D3 has a fairly good ability to deliver content to a respective communication device. In such an instance, based on the determined ability to handle a new content delivery task, the communication management resource 152 assigns the performance status value (health status) of 3 to the edge node D3.

Assume further that the communication management resource 152 determines from monitoring that the edge node D2 is now congested and has a poor ability to deliver content to a respective communication device. In such an instance, based on the determined ability to handle a new content delivery task, the communication management resource 152 assigns the performance status value (health status) of 7 to the edge node D2.

Assume further that the communication management resource 152 determines from monitoring that the edge node D4 has a very poor (or no) ability to deliver content to a respective communication device. In such an instance, based on the determined ability to handle a new content delivery task, the communication management resource 152 assigns the performance status value (health status) of 9 to the edge node D4. In this manner, the communication management resource 152 rates each of the edge nodes.

The assignment of health status to each of the edge nodes results in a ranking of the edge nodes and their ability to deliver content to new communication devices requesting content from the content delivery network 101. For example, the status information 196-4 for time T4 indicates the ranking of edge nodes at cluster 102-4 as follows: edge node D1 is the best candidate in cluster 102-4 to support a new request for delivering content; edge node D3 is a next best candidate to support a new request for delivering content; edge node D2 is the next best candidate to support a new request for delivering content; edge node D4 is a next best candidate to support a new request for delivering content; and so on.

Figure 12:
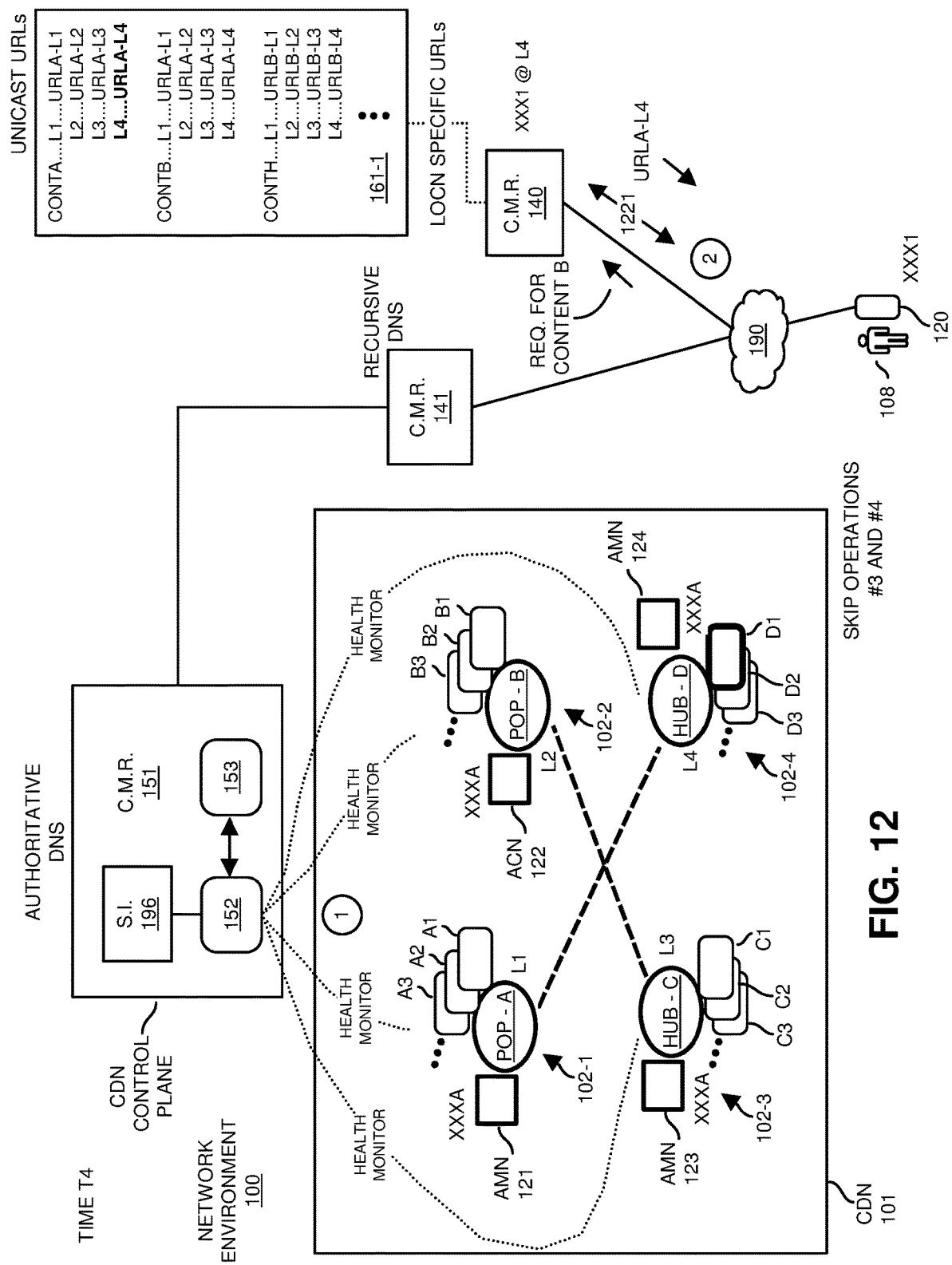
FIG. 12 is an example diagram illustrating operations associated with providing a communication device unicast information for retrieval of content as discussed herein.

FIG. 12 is an example diagram illustrating operations associated with redirecting a client device to an appropriate edge network node to retrieve content as discussed herein.

As previously discussed, via operation #1, the communication management resource 152 tracks a status of multiple different groupings (clusters) of edge nodes, each of which is operative to distribute content (such as video content, segments of video content, digital assets, etc.) in a network environment. For example, via status information 196-4, the communication management resource 152 tracks a first content distribution status of a first cluster 102-1 (group) of network nodes (such as first content distribution edge nodes A1, A2, A3, etc.) assigned and thus managed by a first anycast management node 121; the communication management resource 152 tracks a second content distribution status of a second group (cluster 102-2) of network nodes (such as second content distribution edge nodes B1, B2, B3, etc.) assigned and thus managed by a second anycast management node 122; and so on.

As further shown, the user 108 operates the communication device 120. Assume in this example, in operation #2, at or around time T4, based on input from the user 108, the communication device 120 communicates a respective request for a specific title of content (such as content A) to the communication management resource 140 (such as a so-called streaming back office, application backend, etc.) via communications 1221 from the communication device 120 over network 190 to the communication management resource 140. The request (such as including network address XXX1 as the source communication device 120 requesting the content) by the communication management resource 140 from the communication device 120 may prompt the communication management resource 140 to determine if the communication device 120 and corresponding user 108 are authorized to receive content from the content delivery network 101. The repository 181 stores information indicating which of multiple different URLs is to be used to retrieve the requested content from the content delivery network 101.

Assuming that the communication management resource 140 determines that the communication device 120 and corresponding user 108 are authorized to retrieve content requested by the communication device, in response to receiving the request for content originating from the communication device 120 for assignment of a resource (such as an edge node in any of the groups) from which to retrieve or request retrieval of content, the communication management resource 140 selects and communicates a location specific (unicast) URL and/or network address of an appropriate resource to be used by the communication device 120 to retrieve the requested content A (CONT A). For example, recall that the communication management resource 140 previously learned of the location L4 associated with the mobile communication device 120 (network address XXX1). Based on previously stored information, the communication management resource 140 determines an approximate location of the mobile communication device 120 requesting the content A as being location L4 (location of mobile communication device 120 or location of nearest cluster to the mobile communication device 120) such as via mapping the network address XXX1 of the communication device 120 in the request to the location L4.

Assume that the anycast management nodes assigned network address XXXA are configured to distribute the requested content A to the communication device 120. Since the location L4 of the mobile communication device 120 is known to the communication management resource 140, the communication management resource selects a location specific URL such as unicast URLA-L4 from the information 161-1 to satisfy the request.

In such an instance, the via communications 1221, the communication management resource 140 communicates (such as in a CDN streaming URL response) a specific URL (Uniform Resource Locator) such as unicast information URLA-L4 to the communication device 120. In other words, the communication device 120 requests content A. The communication management resource 140 maps a combination of the requested content A and the location L4 of the communication device to the location specific unicast value/information URLA-4. Communication of the location specific URLA-L4 alleviates the need for the execution of operations 3 and 4 as previously discussed.

The communication device 120 then uses the unicast pointer value URLA-L4 received from the communication management resource 140 as a basis in which to retrieve the respective content A as further discussed below.

Figure 13:
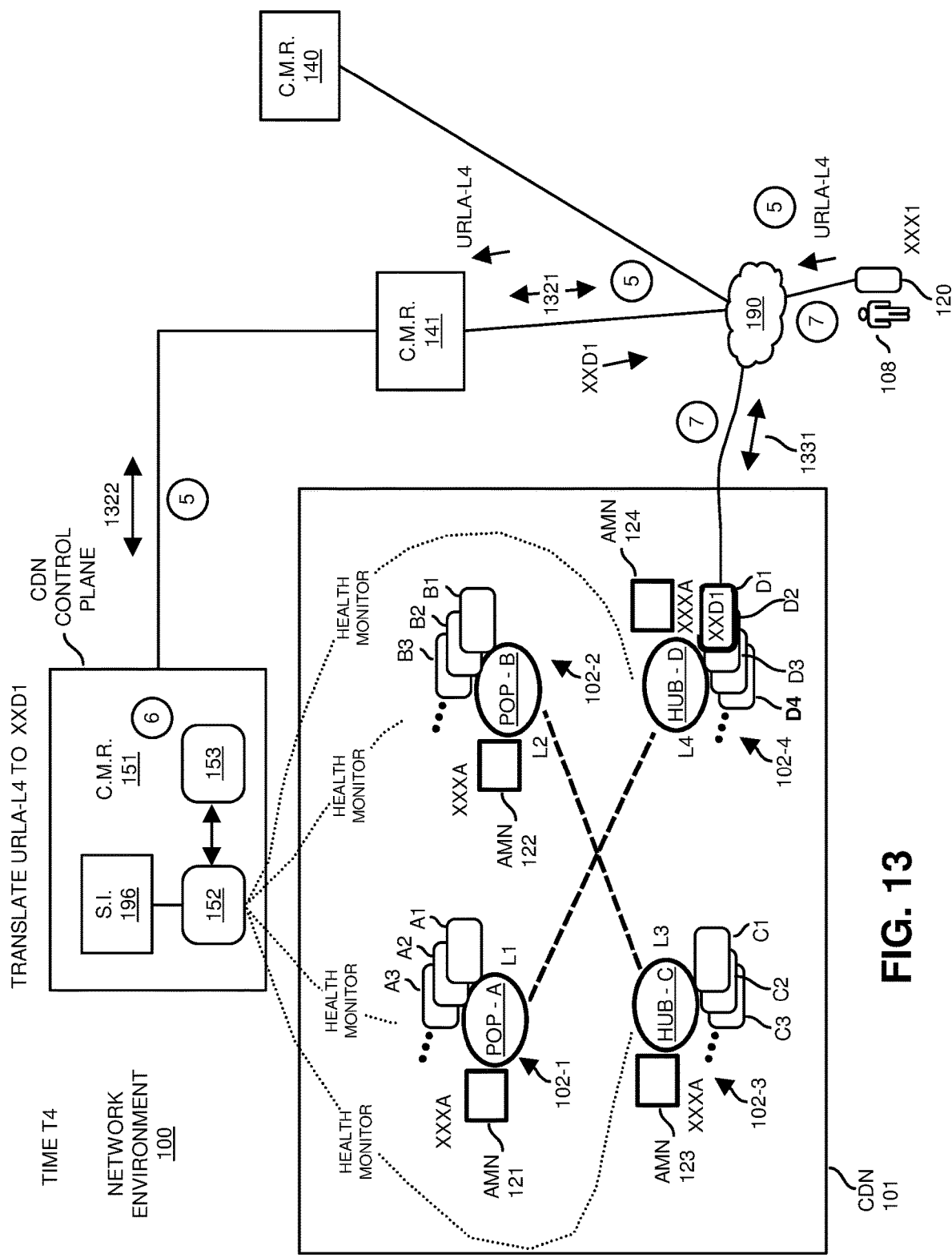
FIG. 13 is an example diagram illustrating operations associated with translation of the unicast information to an appropriate unicast network address of an edge node for retrieval of the requested content as discussed herein.

FIG. 13 is an example diagram illustrating operations associated with redirecting a client device to an appropriate edge network node to retrieve content as discussed herein.

More specifically, in operation #5, via communications 1321, in response to receiving the location specific unicast pointer URLA-L4 from the communication management resource 140 as a source form which to retrieve requested content, the communication device 120 communicates a message with identity of content A to the communication management resource 141 including the unicast information URLA-L4 for conversion to a network address.

A combination of the communication management resource 141 (such as management hardware) and the communication management resource 151 facilitate or manage distribution of content in the network environment 100 from multiple resources associated with the multiple anycast nodes. For example, in response to receiving the message URLA-L4 from the communication device 120 in communications 1321, the communication management resource 141 forwards the content pointer URLA-L4 to the communication management resource 151 for translation into an appropriate unicast network address to provide to the communication device 120 for retrieval of the requested content.

In processing operation #6, via the request received from the communication device 120, the communication management resource 151 can be configured to determine a location L4 associated with the request as well as the specific content requested for retrieval. Using the status information 196-4, the communication management resource 151 determines a unicast network address of a best edge node (near location L4) from which the communication device 120 is to retrieve the requested content A. Thus, instead of the communication device 120 communicating with the anycast management node 124, and the anycast management node 124 deciding which edge node D is to be used to deliver the content to the communication device 120, the global communication management resource 151 and/or communication management resource 153 determines the best edge node from which to assign to the communication device 120 based on analysis of the status information 196-4 for time T4 in a similar manner as previously discussed.

More specifically, as previously discussed, the communication management resource 151 tracks the content distribution status (such as ability for each of the content distribution network nodes to distribute content) in the network environment. The communication management resource 152 produces, for each of the clusters, a ranking of the different edge nodes and their ability to distribute content to the communication device 120 or other communication devices in the network environment 100.

As further discussed herein, the communication management hardware uses the ranking of edge nodes in different clusters of edge nodes as a basis to select an identity of an appropriate network node from the fourth group of edge nodes D to service the communication device 120.

The communication management resource 153 and/or 151 can be configured to first determine a pertinent location (location L4) associated with the communication device 120 based on the received pointer URLA-L4 from communication device 120 or other suitable entity. The communication management resource 151 considers which of the multiple content distribution network nodes (edge nodes) in the cluster 102-4, if any, is best suited to deliver the requested content A to the communication device 120. The status information 196-4 for time T4 in FIG. 11 indicates that ranked edge node D1 is currently a best candidate amongst multiple candidate edge nodes in which to select for use by the communication device 120 to retrieve the requested content. In such an instance, assume that the communication management resource 151 selects the edge node D1 (best of edge nodes D as indicated by the status information 196-4) for use by the communication device 120 because it is the best edge node and potentially only good candidate edge node available in that cluster 102-4. Another factor that can be considered by the communication management resource 151 is that the candidate edge node D1 is quite near the communication device 120. In such an instance, via communications 1322, the communication management resource 153 communicates the identity (such as specific unicast network address XXD1) of the selected edge node D1 to the communication management resource 141. Further, via communications 1321, the communication management resource 141 forwards the identity (unicast network address XXD1) of the selected edge node D1 to the communication device 120.

As further shown, in processing operation #7, and via corresponding communications 1331, the communication device 120 communicates a respective request for the content A to the selected edge node D1 as specified by the unicast network address XXD1 received from the communication management resources 141/151. The request for content A includes the network address XXD1 as the destination as well as includes an identity of the content A being requested for retrieval.

The edge node D1 can be configured to provide the communication device 120 with a manifest file to retrieve different segment of encrypted content from the edge node D1. Based on requests for segments of content, the edge node D1 retrieves the requested segments of content from one or more repositories in the content delivery network 101 and communicates the requested one or more segments of content A to the communication device 120.

Note that the communications may support multiple requests communicated from the communication device 120 to the edge node D1 for a duration of time such as 10 seconds or other suitable amount of time. The edge node D1 responds with appropriate requested one or more segments of content A communicated to the communication device 120.

Figure 14:
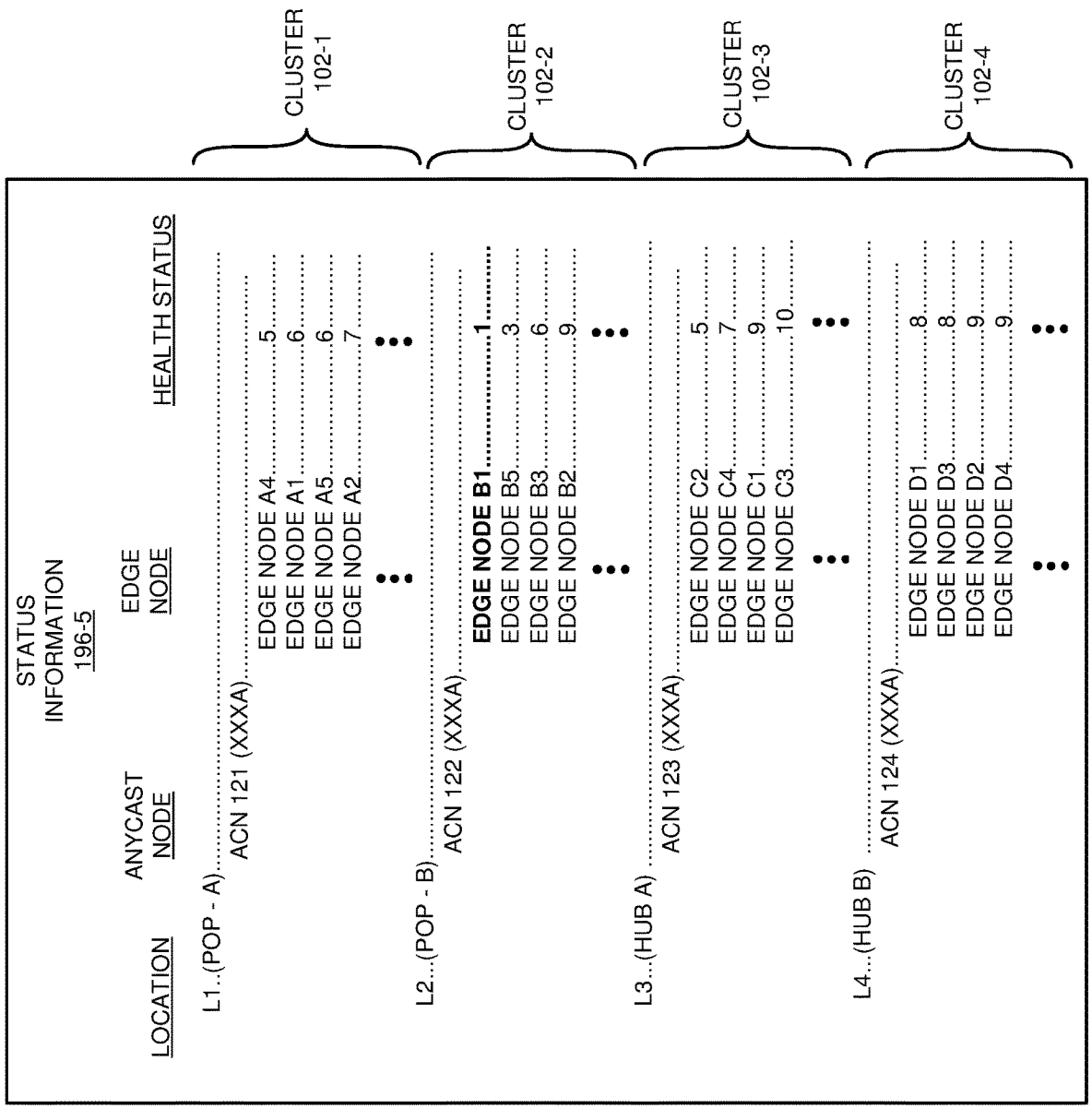
FIG. 14 is an example diagram illustrating status information (such as health status information) associated with content distribution network nodes as discussed herein.

FIG. 14 is an example diagram illustrating status information (such as health) associated with content distribution network nodes as discussed herein.

As previously discussed, the communication management resource 152 generates the status information 196 to track the health of the different network resources in the content distribution network 101 and their ability to handle new content delivery tasks of delivering requested content to each of one or more communication devices. Note again that the communication management resource 152 constantly updates the status information 196 over time because the delivery of content and corresponding ability to handle new content delivery tasks by the edge nodes changes over time. Status information 196-5 illustrates the collective status associated with the different edge nodes at or around time T5.

As previously discussed, the assignment of health status to each of the edge nodes results in a ranking of the edge nodes and their ability to deliver content to new communication devices requesting content from the content delivery network 101.

For example, at or around time T5, the status information 196-5 indicates the ranking of edge nodes at cluster 102-1 as follows: edge node A4 is the best candidate to support a new task/request for delivering content; edge node A1 is a next best candidate to support a new request for delivering content; edge node A5 is the next best candidate to support a new request for delivering content; edge node A2 is a next best candidate to support a new request for delivering content; and so on. In general, the ranking of the edge nodes at different ranking levels indicates an imbalance of the edge nodes delivering content in the network environment. As further discussed herein, selection of the best candidates to handle new content delivery requests helps to balance delivery of content from each of the edge nodes to be more uniform.

The assignment of health status to each of the edge nodes results in a ranking of the edge nodes and their ability to deliver content to new communication devices requesting content from the content delivery network 101. For example, the status information 196-5 at time T5 indicates the ranking of edge nodes at cluster 102-2 as follows: edge node B1 is the best candidate to support a new request for delivering content for cluster 102-2; edge node B5 is a next best candidate to support a new request for delivering content; edge node B3 is the next best candidate to support a new request for delivering content; edge node B2 is a next best candidate to support a new request for delivering content; and so on.

The assignment of health status to each of the edge nodes results in a ranking of the edge nodes and their ability to deliver content to new communication devices requesting content from the content delivery network 101. For example, the status information 196-5 indicates the ranking of edge nodes at cluster 102-3 as follows: edge node C2 is the best candidate in cluster 102-3 to support a new request for delivering content; edge node C4 is a next best candidate to support a new request for delivering content; edge node C1 is the next best candidate to support a new request for delivering content; edge node C3 is a next best candidate to support a new request for delivering content; and so on.

The assignment of health status to each of the edge nodes results in a ranking of the edge nodes and their ability to deliver content to new communication devices requesting content from the content delivery network 101. For example, the status information 196-5 for time T5 indicates the ranking of edge nodes at cluster 102-4 as follows: edge node D1 is the best candidate in cluster 102-4 to support a new request for delivering content; edge node D3 is a next best candidate to support a new request for delivering content; edge node D2 is the next best candidate to support a new request for delivering content; edge node D4 is a next best candidate to support a new request for delivering content; and so on. Each of the edge nodes D are poor candidates to distribute content to communication devices.

Figure 15:
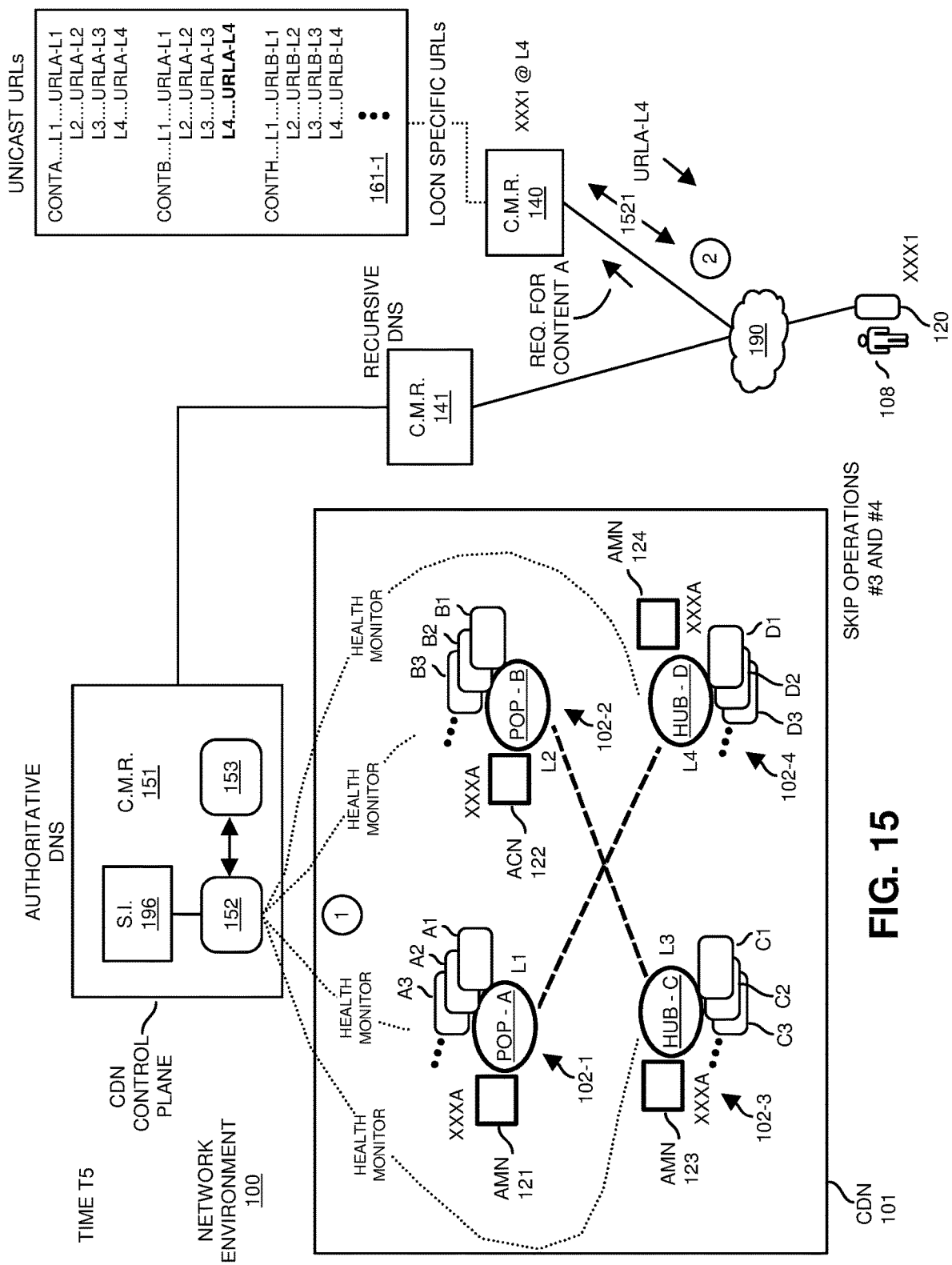
FIG. 15 is an example diagram illustrating operations associated with providing a communication device unicast information for retrieval of content as discussed herein.

FIG. 15 is an example diagram illustrating operations associated with redirecting a client device to an appropriate edge network node to retrieve content as discussed herein.

As previously discussed, via operation #1, the communication management resource 152 tracks a status of multiple different groupings (clusters) of edge nodes, each of which is operative to distribute content (such as video content, segments of video content, digital assets, etc.) in a network environment. For example, via status information 196-5, the communication management resource 152 tracks a first content distribution status of a first cluster 102-1 (group) of network nodes (such as first content distribution edge nodes A1, A2, A3, etc.) assigned and thus managed by a first anycast management node 121; the communication management resource 152 tracks a second content distribution status of a second group (cluster 102-2) of network nodes (such as second content distribution edge nodes B1, B2, B3, etc.) assigned and thus managed by a second anycast management node 122; and so on.

As further shown, the user 108 operates the communication device 120. Assume in this example, in operation #2, at or around time T5, based on input from the user 108, the communication device 120 communicates a respective request for a specific title of content (such as content B) to the communication management resource 140 (such as a so-called streaming back office, application backend, etc.) via communications 1521 from the communication device 120 over network 190 to the communication management resource 140. The request (such as including network address XXX1 as the source communication device 120 requesting the content) by the communication management resource 140 from the communication device 120 may prompt the communication management resource 140 to determine if the communication device 120 and corresponding user 108 are authorized to receive content from the content delivery network 101. The repository 181 stores information indicating which of multiple different URLs is to be used to retrieve the requested content from the content delivery network 101.

Assuming that the communication management resource 140 determines that the communication device 120 and corresponding user 108 are authorized to retrieve content requested by the communication device, in response to receiving the request for content originating from the communication device 120 for assignment of a resource (such as an edge node in any of the groups) from which to retrieve or request retrieval of content, the communication management resource 140 selects and communicates a location specific (unicast) URL and/or network address of an appropriate resource to be used by the communication device 120 to retrieve the requested content B (CONT B). For example, recall that the communication management resource 140 previously learned of the location L4 associated with the mobile communication device 120 (network address XXX1). Based on previously stored information, the communication management resource 140 determines an approximate location of the mobile communication device 120 requesting the content B as being location L4 such as via mapping the network address XXX1 of the communication device 120 in the request to the location L4.

Assume that the anycast management nodes assigned network address XXXA are configured to distribute the requested content B to the communication device 120. Since the location L4 of the mobile communication device 120 is known to the communication management resource 140, the communication management resource selects a location specific URL such as unicast pointer URLA-L4 from the information 161-1 to satisfy the request.

In such an instance, the via communications 1521, the communication management resource 140 communicates (such as in a CDN streaming URL response) a specific URL (Uniform Resource Locator) such as unicast information URLA-L4 to the communication device 120. In other words, the communication device 120 requests content B. The communication management resource 140 maps a combination of the requested content B and the location L4 of the communication device to the location specific unicast value URLA-4. Communication of the location specific URLA-L4 alleviates the need for the execution of operations 3 and 4 as previously discussed.

As further discussed below, the communication device 120 then uses the unicast pointer value or unicast information URLA-L4 received from the communication management resource 140 as a basis in which to retrieve the respective content A.

Figure 16:
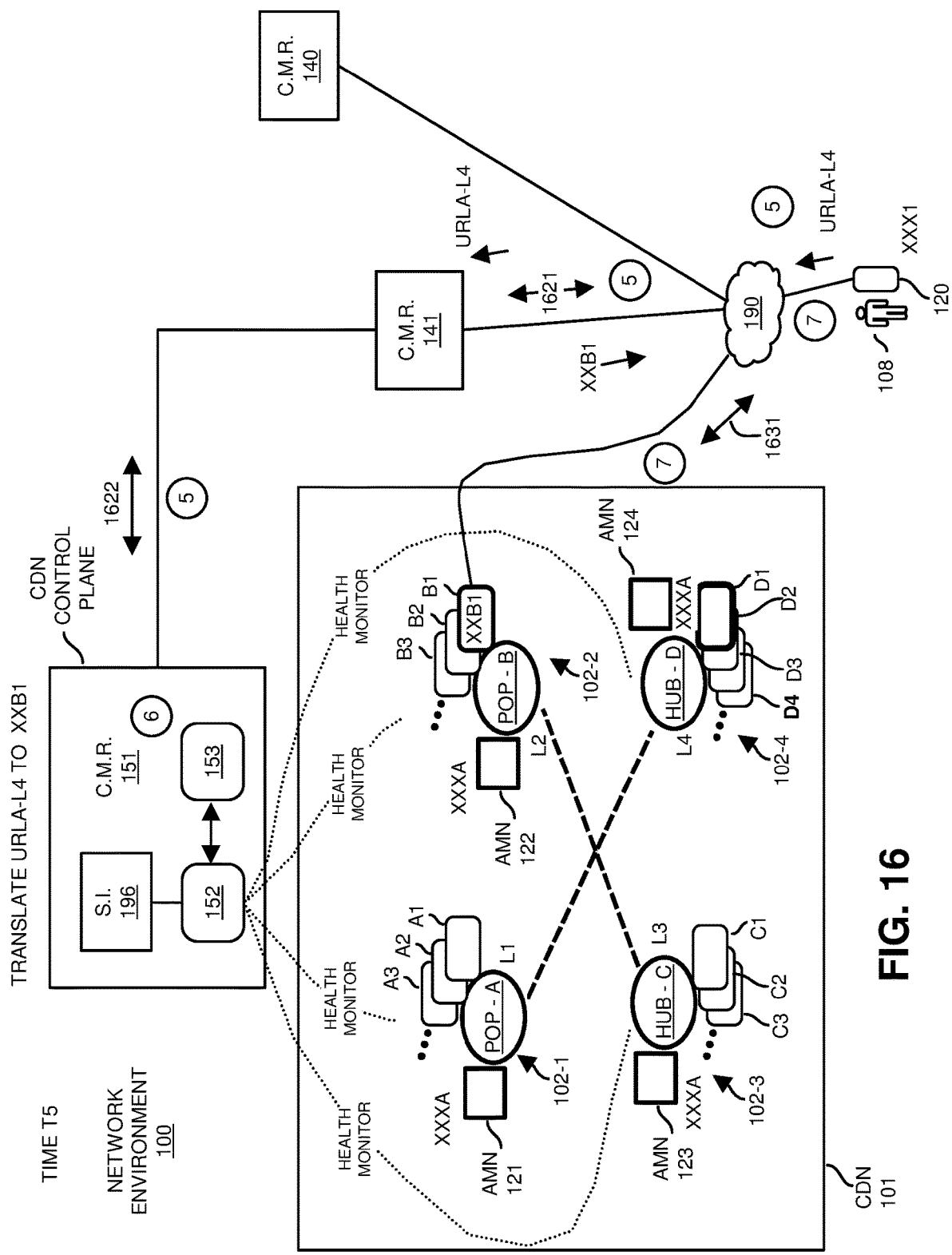
FIG. 16 is an example diagram illustrating operations associated with translation of the unicast information to an appropriate unicast network address of an edge node for retrieval of the requested content as discussed herein.

FIG. 16 is an example diagram illustrating operations associated with redirecting a client device to an appropriate edge network node to retrieve content as discussed herein.

More specifically, in operation #5, via communications 1621, in response to receiving the location specific unicast pointer URLA-L4 from the communication management resource 140 as a source form which to retrieve requested content, the communication device 120 communicates a message to the communication management resource 141 including the unicast information URLA-L4 and identity of content B.

A combination of the communication management resource 141 (such as management hardware) and the communication management resource 151 facilitate or manage distribution of content in the network environment 100 from multiple resources associated with the multiple anycast nodes. For example, in response to receiving the message URLA-L4 from the communication device 120 in communications 1621, the communication management resource 141 forwards the content pointer URLA-L4 to the communication management resource 151 for translation into an appropriate unicast network address to provide to the communication device 120 for retrieval of the requested content.

In processing operation #6, via the request received from the communication device 120, the communication management resource 151 can be configured to determine a location L4 associated with the request as well as the specific content requested for retrieval. Using the status information 196-5, the communication management resource 151 attempts to determine a unicast network address of a best edge node (near location L4) from which the communication device 120 is to retrieve the requested content. Thus, instead of the communication device 120 communicating with the anycast management node 124, and the anycast management node 124 deciding which edge node is to be used to deliver the content to the communication device 120, the communication management resource 151 and/or communication management resource 153 determines the best edge node from which to assign to the communication device 120 based on analysis of the status information 196-5 for time T5 in a similar manner as previously discussed. As shown in status information 196-5, none of the edge nodes D is a good candidate to supply requested content B to the communication device 120. For example, edge node D1 is a poor candidate assigned value 8, edge node D3 is a poor candidate assigned value 8, edge node D2 is a poor candidate assigned value 9, edge node D4 is a poor candidate assigned value 9, and so on.

More specifically, as previously discussed, the communication management resource 151 tracks the content distribution status (such as ability for each of the content distribution network nodes to distribute content) in the network environment. The communication management resource 152 produces, for each of the clusters, a ranking of the different edge nodes and their ability to distribute content to the communication device 120 or other communication devices in the network environment 100.

As further discussed herein, the communication management hardware uses the ranking of edge nodes in different clusters of edge nodes as a basis to select an identity of an appropriate network node from which to serve requested content B to the communication device 120.

In a similar manner as previously discussed, the communication management resource 153 and/or 151 can be configured to first determine a pertinent location (location L4) associated with the communication device 120 based on the received pointer URLA-L4 from communication device 120 or other suitable entity in communications 1621. The communication management resource 151 considers which of the multiple content distribution network nodes (edge nodes) in the cluster 102-4, if any, is best suited to deliver the requested content B to the communication device 120. The status information 196-5 for time T5 in FIG. 14 indicates that edge node B1 in cluster 102-2 is the best node from which to serve the communication device 120 content B. In such an instance, via communications 1622, the communication management resource 153 communicates the identity (such as specific unicast network address XXB1) of the selected edge node B1 to the communication management resource 141. Further, via communications 1621, the communication management resource 141 forwards the identity of the selected edge node B1 (unicast network address XXB1) to the communication device 120.

As further shown, in processing operation #7, and via corresponding communications 1631, the communication device 120 communicates a respective request for the content to the selected edge node B1 as specified by the unicast network address XXB1 received from the communication management resources 141/151. The request for content B includes the network address XXB1 (used by the content delivery network 101 to deliver the request directly to edge node B1 as the destination as well as includes an identity of the content B being requested for retrieval.

The edge node B1 or other suitable entity can be configured to provide the communication device 120 with a manifest file to retrieve different segment of encrypted content from the edge node B1. Based on requests for segments of content, the edge node B1 retrieves the requested segments of content from one or more repositories in the content delivery network 101 and communicates the requested one or more segments of content B to the communication device 120.

Figure 17:
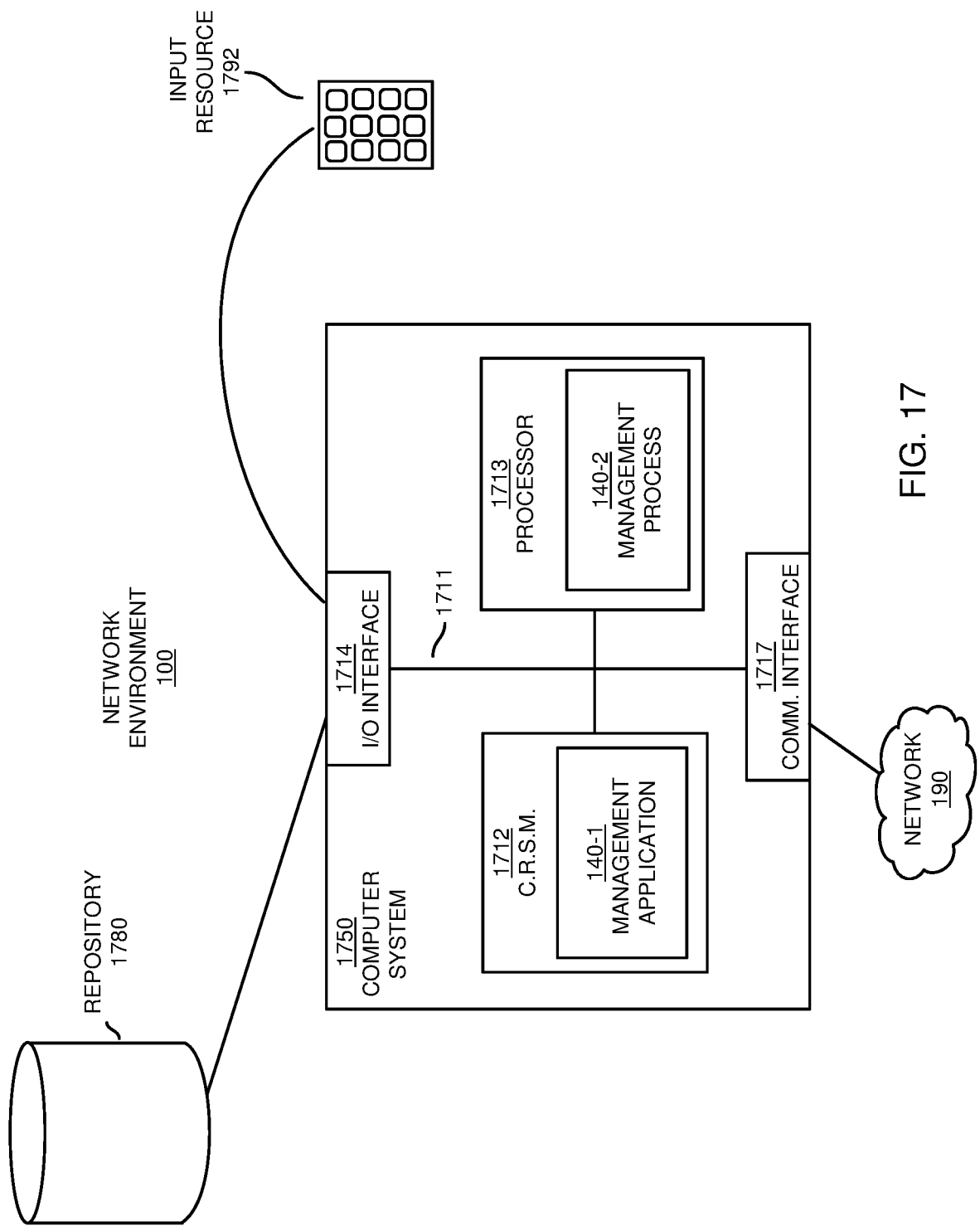
FIG. 17 is an example diagram illustrating example computer architecture operable to execute one or more operations according to embodiments herein.

FIG. 17 is an example block diagram of a computer system for implementing any of the operations as discussed herein.

Any of the resources (such as communication management resource 151, communication management resource 152, communication management resource 153, communication management resource 141, communication management resource 140, communication device 120, etc.) as discussed herein can be configured to include computer processor hardware and/or corresponding executable instructions to carry out the different operations as discussed herein.

As shown, computer system 1750 of the present example includes an interconnect 1711 that couples computer readable storage media 1712 (such as a non-transitory type of media, any suitable type of hardware storage medium in which digital information can be stored and retrieved, computer-readable storage hardware, etc.), a processor 1713 (computer processor hardware), I/O interface 1714, and a communications interface 1717.

I/O interface(s) 1714 supports connectivity to repository 1780 and input resource 1792.

Computer readable storage medium 1712 can be any hardware storage device such as memory, optical storage, hard drive, floppy disk, etc. In one embodiment, the computer readable storage medium 1712 stores instructions and/or data.

As shown, computer readable storage media 1712 can be encoded with communication management application 140-1 (e.g., including instructions) to carry out any of the operations as discussed herein.

During operation of one embodiment, processor 1713 accesses computer readable storage media 1712 via the use of interconnect 1711 in order to launch, run, execute, interpret or otherwise perform the instructions in management application 140-1 stored on computer readable storage medium 1712. Execution of the communication management application 140-1 produces communication management process 140-2 to carry out any of the operations and/or processes as discussed herein.

Those skilled in the art will understand that the computer system 1750 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1750 may reside at any location or can be included in any suitable resource in any network environment to implement functionality as discussed herein.

Functionality supported by the different resources will now be discussed via flowcharts in FIGS. 18, 19, and 20. Note that the steps in the flowcharts below can be executed in any suitable order.

Figure 18:
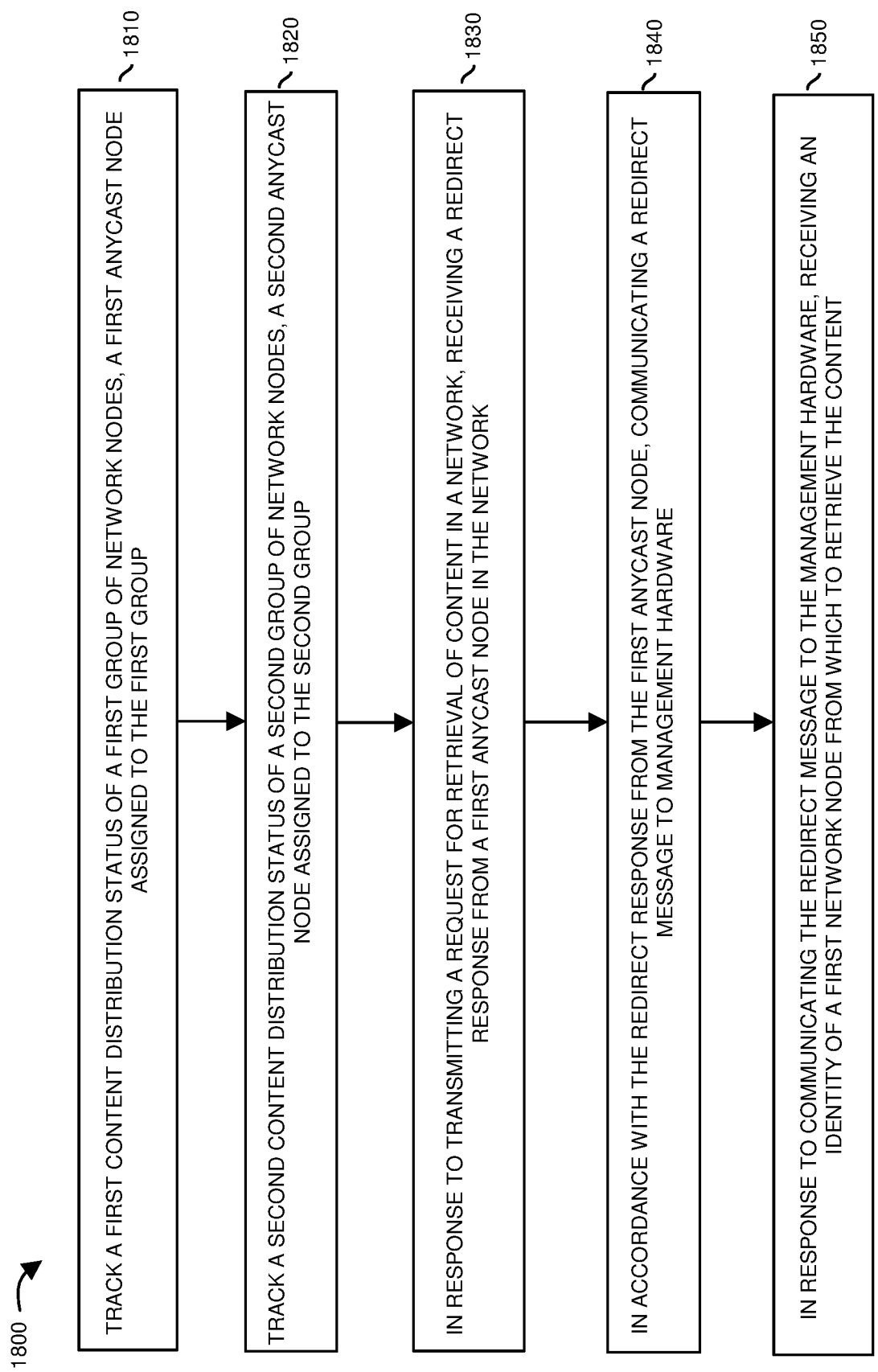
FIG. 18 is an example diagram illustrating a method of implementing redirect of a client as discussed herein.

FIG. 18 is a flowchart 1800 illustrating an example method according to embodiments. Note that there will be some overlap with respect to concepts as discussed above.

In processing operation 1810, the communication management resource 151 tracks a first content distribution status of a first group of network nodes. A first anycast management node is assigned to manage the first group.

In processing operation 1820, the communication management resource 151 tracks a second content distribution status of a second group of network nodes. A second anycast management node is assigned to manage the second group.

In processing operation 1830, in response to a communication device transmitting a request for retrieval of content in a network, the communication device receives a redirect response from the first anycast management node in the network.

In processing operation 1840, in accordance with the redirect response from the first anycast management node, the communication device communicates a redirect message to the communication management resource 151.

In processing operation 1850, in response to communicating the redirect message to the management resource 151 (such as communication management hardware), the communication device receives an identity of a specific network node (such as a first network node) from which to retrieve the content.

Figure 19:
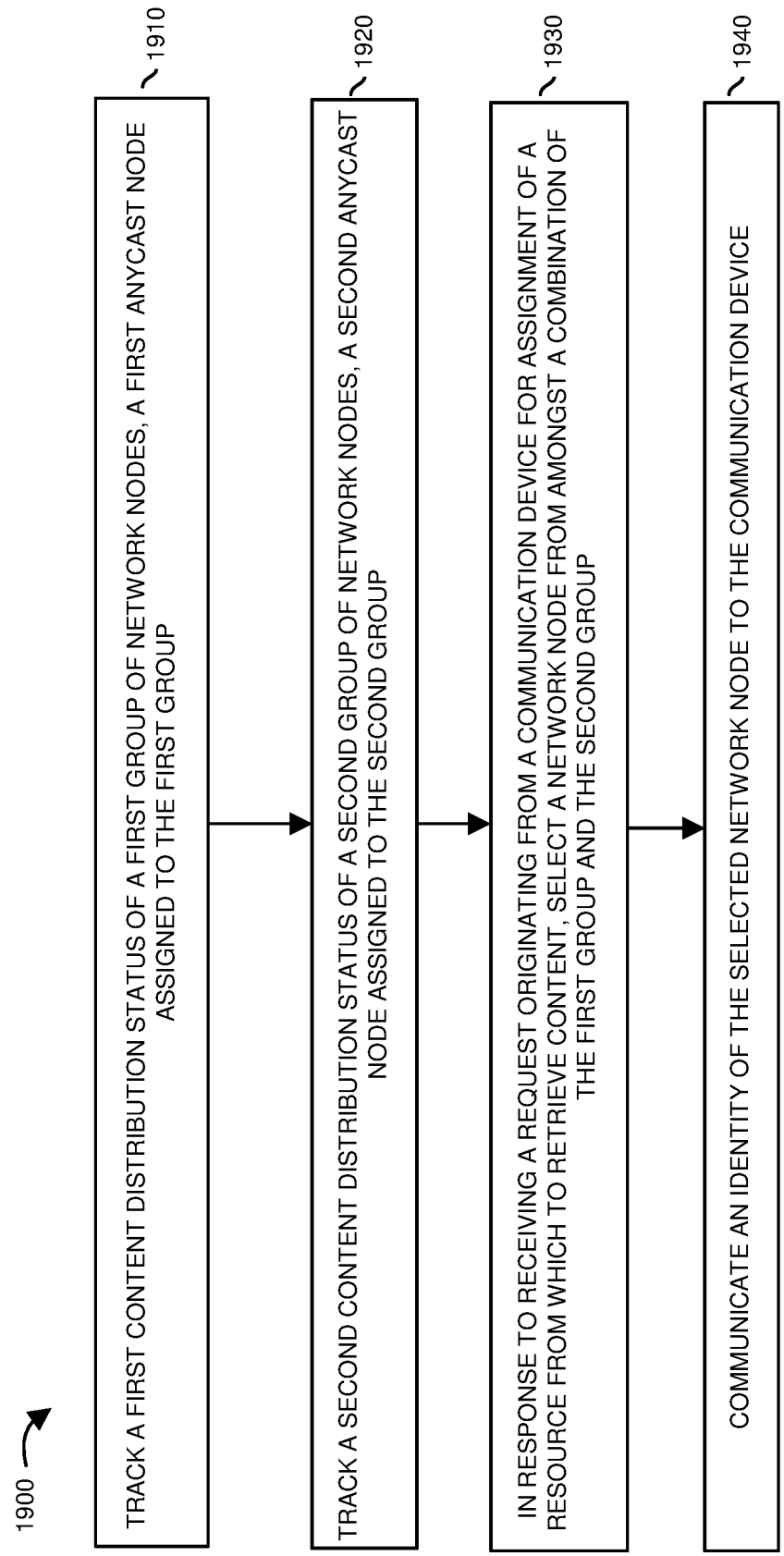
FIG. 19 is an example diagram illustrating a method of implementing content distribution as discussed herein.

FIG. 19 is a flowchart 1900 illustrating an example method according to embodiments. Note that there will be some overlap with respect to concepts as discussed above.

In processing operation 1910, a communication management resource 151 tracks a first content distribution status of a first group of network nodes managed by a first anycast management node assigned to the first group.

In processing operation 1920, the communication management resource 151 tracks a second content distribution status of a second group of network nodes managed by a second anycast management node assigned to the second group.

In processing operation 1930, in response to receiving a request originating from a communication device for assignment of a resource from which to retrieve content, the communication management resource 151 selects a network node able to distribute the requested content communication device. The communication management resource 151 selects the network node from amongst a combination of the first group (cluster) and the second group (cluster).

In processing operation 1940, the communication management resource 151 communicates an identity of the selected network node to the communication device. The communication device then communicates with the sled network node to retrieve the desired content.

Figure 20:
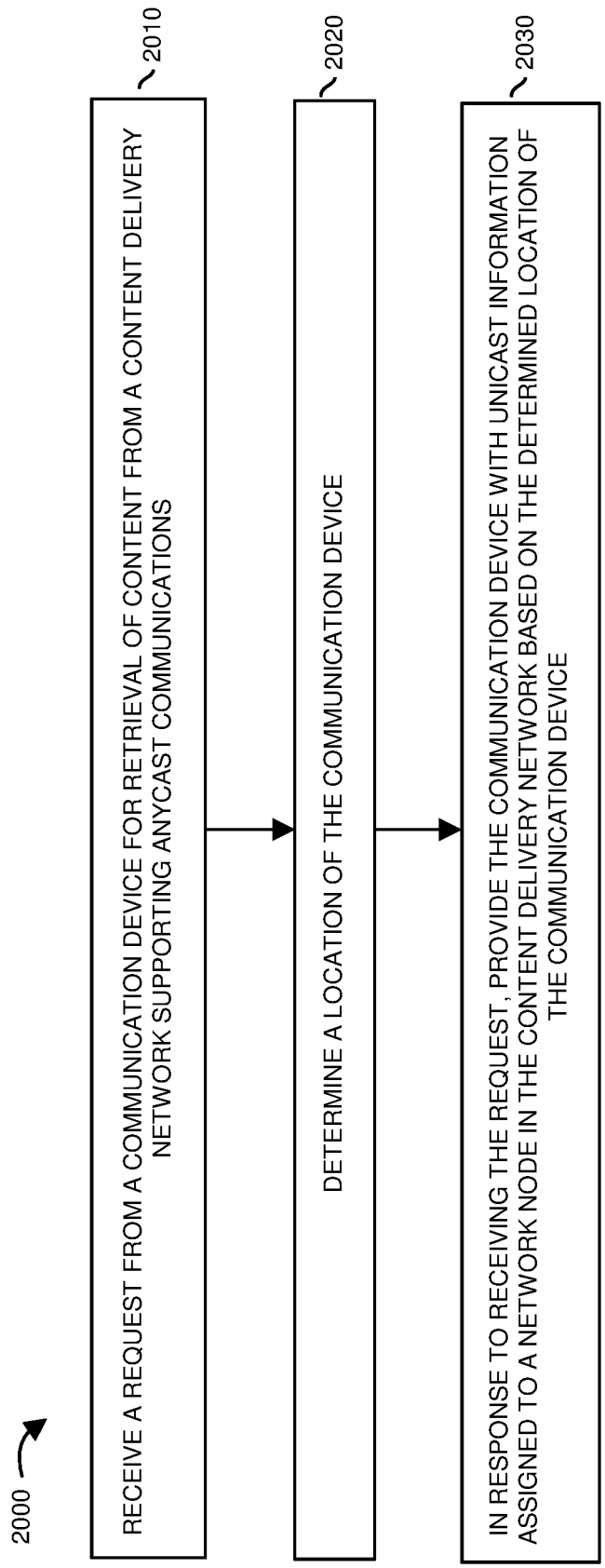
FIG. 20 is an example diagram illustrating a method of implementing content distribution as discussed herein.

FIG. 20 is a flowchart 2000 illustrating an example method according to embodiments. Note that there will be some overlap with respect to concepts as discussed above.

In processing operation 2010, a communication management resource receives a request from a communication device 120 for retrieval of content from a content delivery network 101 supporting anycast communications.

In processing operation 2020, the communication management resource determines a location (such as location L4) associated with the communication device 120.

In processing operation 2030, in response to receiving the request, the communication management resource provides the communication device 120 with unicast information (such as content pointer URLA-L4) assigned to a network node (such as any resource associated with cluster at L4 including HUB-D, anycast management node 124, edge node D1, edge node D2, edge node D3, etc.) in the content delivery network 101 based on the determined location L4 associated with the communication device 120.

Note again that techniques herein are well suited to facilitate monitoring of available content distribution nodes and efficiently control distribution of content in an anycast network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving a request from a communication device for retrieval of content from a content delivery network supporting anycast communications;
   determining a location associated with the communication device; and
   in response to receiving the request, based on the determined location associated with the communication device: i) selecting a first network node from multiple groups of network nodes including a first group of network nodes and a second group of network nodes disposed in the content delivery network, the first group of network nodes disparately located with respect to the second group of network nodes, ii) producing unicast information specifying a first network address assigned to the first network node selected from the multiple groups of network nodes, and iii) transmitting the unicast information to the communication device.

2. The method as in claim 1, wherein the unicast information is unicast web information indicating a destination in the content delivery network from which to retrieve the requested content.

3. The method as in claim 1, wherein the unicast information is a location specific URL (Uniform Resource Locator) associated with the content delivery network.

4. The method as in claim 1 further comprising:
   prior to receiving the request from the communication device, receiving feedback from an anycast node in the content delivery network, the feedback indicating the location associated with the communication device.

5. The method as in claim 1, wherein determining the location associated with the communication device includes:
   retrieving a second network address, the second network address retrieved from the request, the second network address assigned to the communication device; and
   mapping the second network address to the location associated with the communication device.

6. The method as in claim 1 further comprising:
   tracking a duration of time in which the determined location associated with the communication device is valid.

7. The method as in claim 1 further comprising:
   tracking a first content delivery status of the first group of network nodes in the content delivery network, a first anycast management node assigned to manage the first group; and
   tracking a second content delivery status of the second group of network nodes in the content delivery network, a second anycast management node assigned to manage the second group.

8. The method as in claim 7, wherein transmitting the unicast information to the communication device includes communicating the first network address to the communication device for use by the communication device to retrieve the requested content from the first network node in the content delivery network.

9. The method as in claim 7, wherein the first network node resides in the second group of network nodes;
   wherein the network nodes in the first group reside at the location; and
   wherein the network nodes in the second group reside at a disparate location with respect to the network nodes in the first group.

10. The method as in claim 7, wherein the tracked first content delivery status indicates a first relative ability of each of the network nodes in the first group to support distribution of the content to the communication device; and
    wherein the tracked second content delivery status indicates a second relative ability of each of the network nodes in the second group to support distribution of the content to the communication device.

11. The method as in claim 10, wherein the first network node is selected from the first group of network nodes in response to detecting that the first network node has been assigned a higher relative ability to deliver the content to the communication device than other network nodes in the first group.

12. The method as in claim 10, wherein the first network node is selected from a combination of the first group of network nodes and the second group of network nodes, the first network node selected in response to detecting that the first network node has been assigned a higher relative ability to deliver the content to the communication device than other network nodes in the first group and other network nodes in the second group.

13. The method as in claim 7, wherein the first content delivery status includes a first ranking of the network nodes in the first group; and wherein the second content delivery status includes a second ranking of the network nodes in the second group.

14. The method as in claim 13, wherein the first ranking includes the first network node and a second network node;

wherein the second ranking includes a third network node and a fourth network node.

15. The method as in claim 14, wherein the first network node is ranked higher than the second network node in the first group of network nodes; and wherein the third network node is ranked higher than the fourth network node in the second group of network nodes.

16. The method as in claim 1, wherein the location indicates a geographical region in which the communication device resides.

17. The method as in claim 1, wherein the first network node is selected from the first group of network nodes and second group of network nodes, the first network node selected in response to detecting that the first network node has been assigned a higher relative ability to deliver the content to the communication device than other network nodes in the first group and other network nodes in the second group.

18. The method as in claim 1, wherein the first network node is assigned a numerical value, the numerical value indicating that the first network node is ranked higher than a second network node in the first group, the numerical value indicating that the first network node is ranked higher than a third network node in the second group.

19. The method as in claim 18, wherein the communication device is disposed nearer in distance with respect to the first group of network nodes than the second group of network nodes.

20. The method as in claim 18, wherein the communication device is disposed nearer in distance with respect to the second group of network nodes than the first group of network nodes.

21. A method comprising:
tracking a first content delivery status associated with a first group of network nodes in a content delivery network, a first anycast node assigned to the first group;
tracking a second content delivery status associated with a second group of network nodes in the content delivery network, a second anycast node assigned to the second group; and
in response to receiving a request originating from a communication device for assignment of a resource from which to retrieve content: i) selecting a network node from amongst a combination of the first group and the second group, and ii) communicating an identity of the selected network node to the communication device.

22. The method as in claim 21, wherein the request from the communication device indicates an identity of the first anycast node.

23. The method as in claim 22, wherein the selected network node resides in the first group.

24. The method as in claim 22, wherein the selected network node resides in the second group.

25. The method as in claim 21, wherein the first anycast node and the second anycast node are assigned a same anycast network address.

26. The method as in claim 21, wherein selecting the network node from a combination of the first group and the second group includes:
in response to detecting that the second anycast node resides in a vicinity of the first anycast node and that the network nodes in the first group are unavailable to distribute the content to the communication device, selecting the identity of the network node from the second group of network nodes.

27. The method as in claim 21 further comprising:
ranking the network nodes in the first group based on respective abilities of the network nodes in the first group to distribute the content from the content delivery network to the communication device; and
utilizing the ranking as a basis to select the identity of the network node from the first group.

28. The method as in claim 21, wherein the first group of network nodes and the second group of network nodes in the content delivery network support delivery of the content in accordance with anycast routing through the content delivery network.

29. The method as in claim 21, wherein the request from the communication device includes a location specific identifier selected based on a location of the communication device in a network environment.

30. The method as in claim 29, wherein the location of the communication device is known based on anycast routing of a communication from the communication device to the first anycast node assigned to the first group.

31. The method as in claim 21, wherein the first group of network nodes reside in a first geographical region of the content delivery network; and
wherein the second group of network nodes reside in a second geographical region of the content delivery network.

32. An apparatus comprising:
communication management hardware operative to:
track a first content delivery status associated with a first group of network nodes in a content delivery network, a first anycast node assigned to the first group;
track a second content delivery status associated with a second group of network nodes in the content delivery network, a second anycast node assigned to the second group;
in response to receiving a request originating from a communication device for assignment of a resource from which to retrieve content: i) select a network node from amongst a combination of the first group and the second group, and ii) communicate an identity of the selected network node to the communication device.

33. The apparatus as in claim 32, wherein the first anycast node and the second anycast node are assigned a same anycast network address.

34. The apparatus as in claim 32, wherein the request from the communication device indicates an identity of the first anycast node.

35. The apparatus as in claim 34, wherein the selected network node resides in the first group.

36. The apparatus as in claim 34, wherein the selected network node resides in the second group.

37. The apparatus as in claim 32, wherein the communication management hardware is further operative to:
- map an identity of a first anycast node as specified by the request to a first location in the network; and
- in response to detecting that the second anycast node resides in a vicinity of the first anycast node and that the network nodes in the first group are unavailable to distribute the content to the communication device, select the network node from the second group of network nodes.

38. The apparatus as in claim 32, wherein the communication management hardware operative to:
- rank the network nodes in the first group based on their ability to distribute the content to the communication device; and
- utilize the ranking as a basis to select the identity of the network node from the first group.

39. The apparatus as in claim 32, wherein the first group of network nodes and the second group of network nodes support delivery of content in accordance with an anycast routing protocol through the content delivery network.

40. The apparatus as in claim 32, wherein the request from the communication device includes a location specific identifier indicating a location of the communication device in the network environment.

41. The apparatus as in claim 40, wherein the location of the communication device is known based on anycast routing of a communication from the communication device to the anycast node assigned to the first group.

42. The apparatus as in claim 32, wherein the first group of network nodes reside in a first geographical region of the content delivery network; and
- wherein the second group of network nodes reside in a second geographical region of the content delivery network.

43. Computer-readable storage hardware having instructions stored thereon, the instructions, when carried out by computer processor hardware, cause the computer processor hardware to:
- receive a request from a communication device for retrieval of content from a content delivery network supporting anycast communications;
- determine a location associated with the communication device; and
- in response to receiving the request, based on the determined location associated with the communication device: i) select a first network node from multiple groups of network nodes including a first group of network nodes and a second group of network nodes disposed in the content delivery network, the first group of network nodes disparately located with respect to the second group of network nodes, ii) produce unicast information specifying a first network address assigned to the first network node selected from the multiple groups of network nodes, and iii) transmit the unicast information to the communication device.

\* \* \* \* \*